United States Patent
Radloff et al.

(10) Patent No.: US 12,306,679 B2
(45) Date of Patent: May 20, 2025

(54) SYSTEM AND METHOD OF MANUFACTURING A HAPTIC TOUCHPAD AND PALM REST ASSEMBLY WITH LIGHT-DIFFUSING COMPOSITE SUBSTRATE OF WOVEN GLASS FIBER IMPREGNATED WITH POLYCARBONATE

(71) Applicant: Dell Products, LP, Round Rock, TX (US)

(72) Inventors: Timothy M. Radloff, Austin, TX (US); Priyank J. Gajiwala, Austin, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 0 days.

(21) Appl. No.: 18/140,416

(22) Filed: Apr. 27, 2023

(65) Prior Publication Data

US 2024/0361813 A1    Oct. 31, 2024

(51) Int. Cl.
*G06F 1/16*     (2006.01)
*G06F 3/01*     (2006.01)
*G06F 3/044*    (2006.01)
G06F 3/041      (2006.01)

(52) U.S. Cl.
CPC ............. *G06F 1/169* (2013.01); *G06F 3/016* (2013.01); *G06F 3/0446* (2019.05); *G06F 3/0416* (2013.01); *G06F 2203/04103* (2013.01)

(58) Field of Classification Search
CPC ............. G06F 1/169; G06F 3/016; G06F 2203/04103; G06G 3/0446; G16F 3/0416
See application file for complete search history.

(56) References Cited

U.S. PATENT DOCUMENTS

| | | | |
|---|---|---|---|
| 5,920,310 A | 7/1999 | Faggin | |
| 5,952,998 A | 9/1999 | Clancy | |
| 7,804,487 B1 | 9/2010 | Acampora | |
| 8,043,669 B2 | 10/2011 | Ohno | |
| 8,476,355 B2 * | 7/2013 | Ban | C08L 69/00 |
| | | | 524/494 |

(Continued)

OTHER PUBLICATIONS

U.S. Appl. No. 17/356,222, filed Jun. 23, 2021, 34 pages.

*Primary Examiner* — Matthew A Eason
*Assistant Examiner* — Sujit Shah
(74) *Attorney, Agent, or Firm* — Prol Intellectual Property Law, PLLC; H. Kenneth Prol

(57) ABSTRACT

A touchpad and palm rest base chassis assembly for an information handling system may comprise a base chassis for enclosing the information handling system including a keyboard opening, and a plurality of palm rest support surfaces, and a composite substrate of woven glass fiber impregnated with polycarbonate material forming a touchpad surface, through which haptic feedback may be provided and touch may be sensed by capacitive sensors including a printed circuit board assembly (PCBA) operatively connected to the composite substrate having a light emitting diode (LED) disposed within an etched opening on the underside of the composite substrate formed to guide LED light into the light transmissive composite substrate of the touchpad surface to illuminate an icon opening within an inked surface of the composite substrate to negate need of a separate light guide layer, and the touchpad and palm rest base chassis assembly affixed to the base chassis.

20 Claims, 18 Drawing Sheets

(56) References Cited

U.S. PATENT DOCUMENTS

| | | | |
|---|---|---|---|
| 9,513,673 B2 | 12/2016 | Hotelling | |
| 9,632,638 B2 | 4/2017 | Worfolk | |
| 10,606,323 B1* | 3/2020 | Chang | H05K 5/0226 |
| 11,675,119 B1* | 6/2023 | Ho | G02B 6/0068 |
| | | | 362/606 |
| 2010/0300772 A1 | 12/2010 | Lee | |
| 2014/0090990 A1 | 4/2014 | Richardson | |
| 2018/0218859 A1* | 8/2018 | Ligtenberg | H01H 13/86 |
| 2021/0325989 A1* | 10/2021 | Tang | G06F 3/0445 |
| 2021/0398847 A1* | 12/2021 | Parekh | H01L 21/76897 |

* cited by examiner

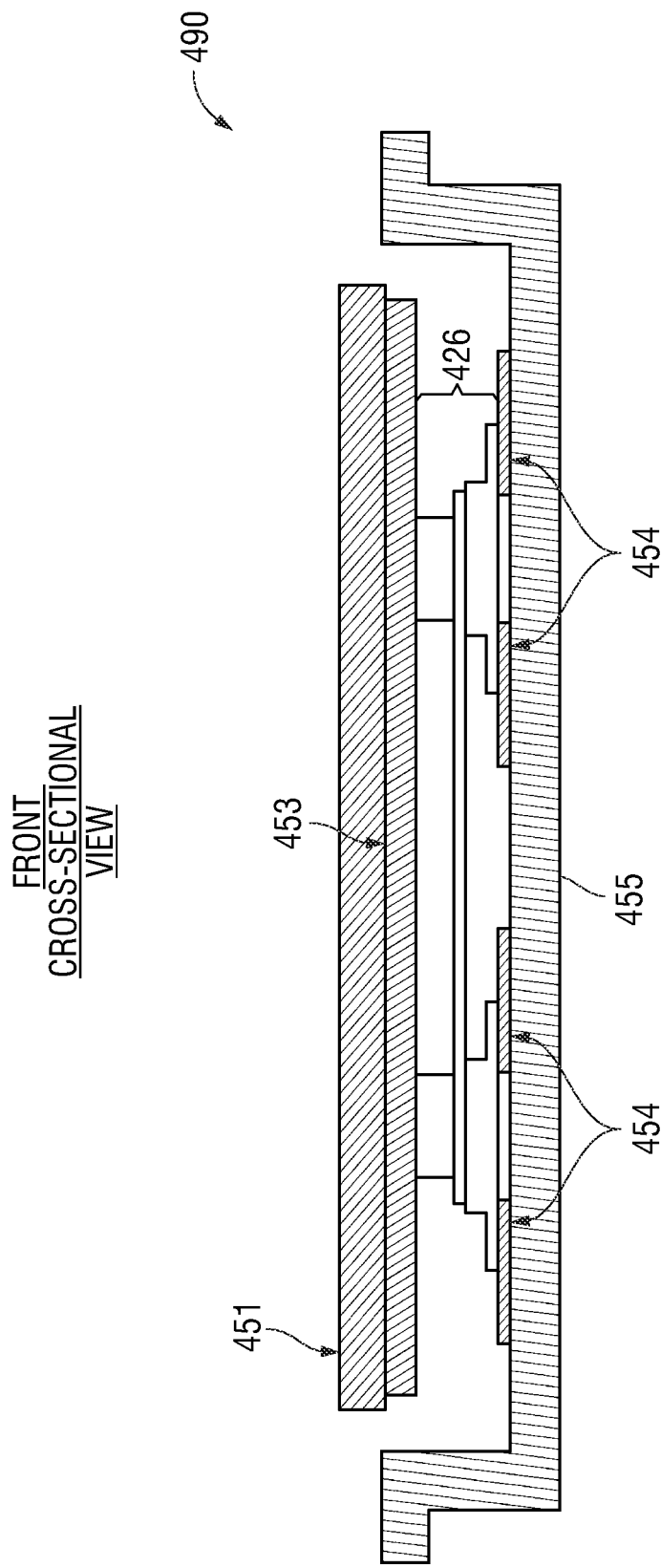

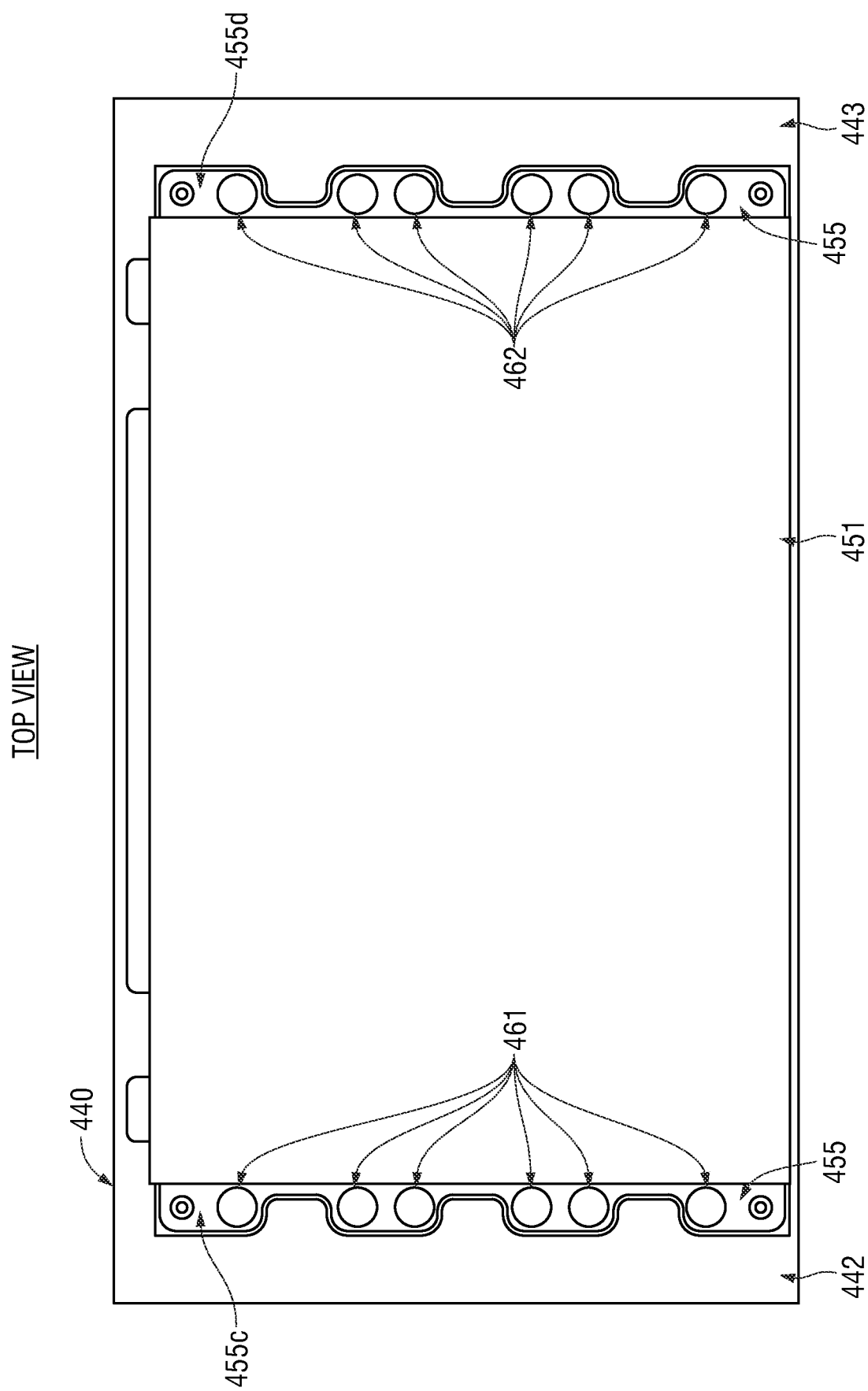

SYSTEM AND METHOD OF MANUFACTURING A HAPTIC TOUCHPAD AND PALM REST ASSEMBLY WITH LIGHT-DIFFUSING COMPOSITE SUBSTRATE OF WOVEN GLASS FIBER IMPREGNATED WITH POLYCARBONATE

FIELD OF THE DISCLOSURE

The present disclosure generally relates to assembly of a base chassis for an information handling system incorporating a touchpad, keyboard, and palm rests. More specifically, the present disclosure relates to the use of a composite substrate of woven glass fiber impregnated with polycarbonate material for strength and durability as a light-diffusing top surface of a haptic-feedback touchpad assembly that negates the need for a separate lightguide layer and results in a thinner palm rest assembly for an information handling system.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include one or more input devices incorporated within a base chassis, including a keyboard and touchpad, for example.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 4A is a graphical diagram illustrating a front cross-sectional view of a haptic touchpad assembly according to an embodiment of the present disclosure;

FIG. 4D is a graphical diagram illustrating a top view of a haptic touchpad assembly mechanically and operatively coupled to a base chassis upper portion via top-mounted fasteners according to an embodiment of the present disclosure;

The use of the same reference symbols in different drawings may indicate similar or identical items.

DETAILED DESCRIPTION OF THE DRAWINGS

Figure 1:
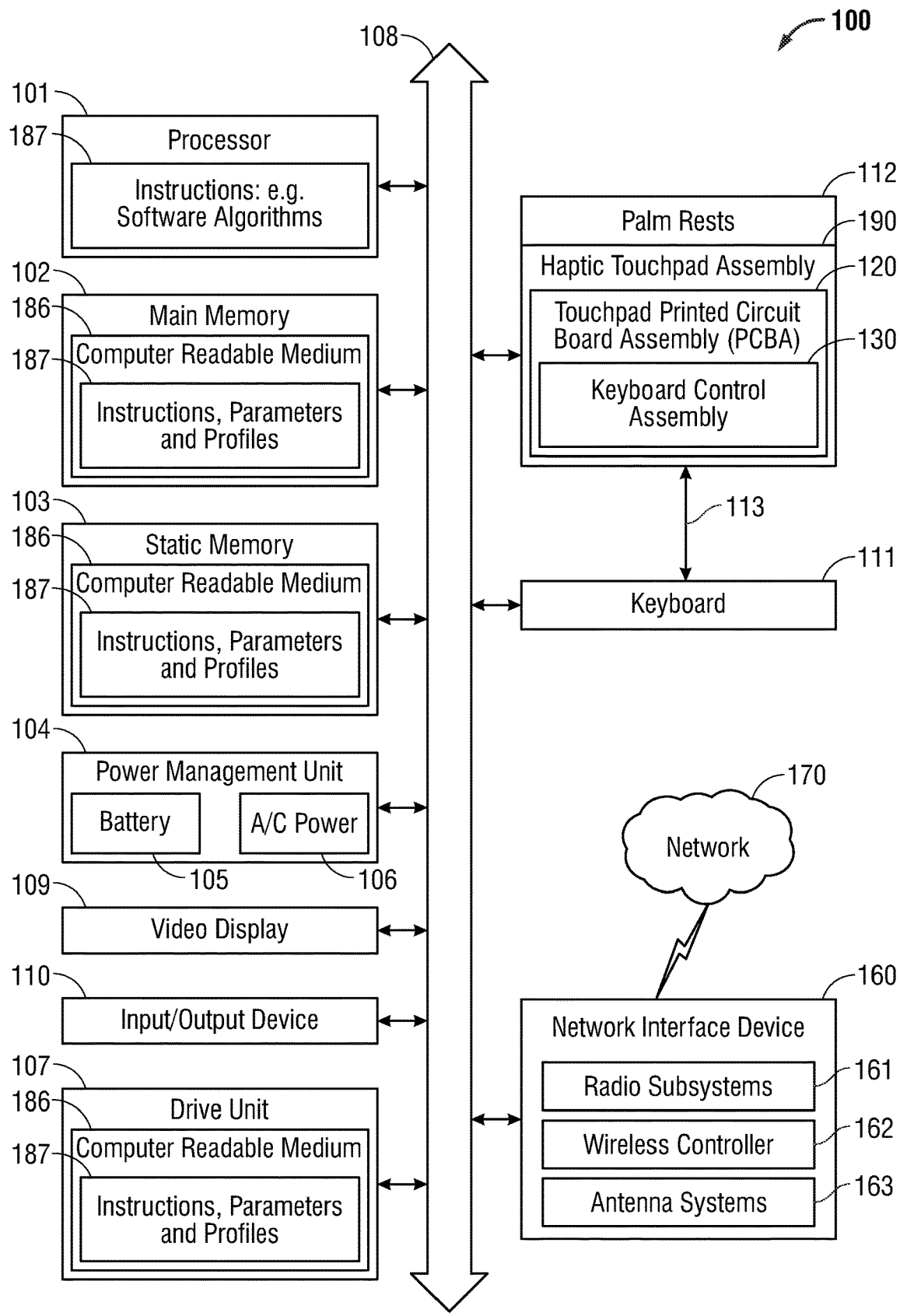
FIG. 1 is a block diagram illustrating an information handling system operably coupled to a haptic touchpad assembly according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Information handling systems, such as notebook, tablet, and laptop computers may include a display chassis housing the video display screen, and a base chassis housing a keyboard, touchpad, and various internal components necessary for operation of the information handling system, such as processors, memory, buses, and network interface devices, for example. The base chassis for such information handling systems may include an upper portion where the keyboard and touchpad may be situated and accessible by the user, and a bottom portion that mates with the upper portion to enclose the various operational components (e.g., processor, memory, etc.). Many conventional base chasses are manufactured by inserting a keyboard and a touchpad into openings formed through the upper portion of the base chassis, such that all four sides of the touchpad and the keyboard are surrounded by the upper portion of the base chassis. In such a dive-board-type approach, at least one edge of the touchpad assembly (e.g., rear edge lying closest to the keyboard) may need to be firmly attached to the base chassis to provide a dive-board movement of the touchpad assembly to trigger a switch for clicking or a selection action. This may also cause an inability to physically depress or "click" a portion of the touchpad situated closest to the edge affixed to the base chassis. The dive-board-type design may also limit the area of the touchpad surface available for actuation. With embodiments of the present disclosure, a haptic touchpad may be used. However, haptic touchpad stacks may be deep in a z-direction of the base chassis of an information handling system. The embodiments of the present disclosure provide for a thin but rigid material of woven glass fiber impregnated with polycarbonate for a top surface of a haptic touchpad. Further, the touchpad surface layer of woven glass fiber impregnated with polycarbonate material may be optically transmissive, such that an additional lightguide layer may be eliminated to provide touchpad illumination in embodiments herein.

Many conventional base chasses employ a polycarbonate-based substrate for the upper portion of the base chassis and the touchpad surface. The base chassis upper portion in such a conventional chassis, for example, may use a unitary piece of material (e.g., polycarbonate resin plastics, aluminum or other metals), as a top surface of a touchpad. A polycarbonate-based substrate alone requires the top surface of a touchpad to be supported with a lower support structure or thicker touchpad surface layer, because the polycarbonate-based substrate alone cannot provide sufficient stiffness required for haptic touchpad operation. Metal touchpad surfaces may not or cannot conduct light and require a lightguide layer. In other words, conventional base chasses may employ a haptic touchpad assembly having a surface material that requires an increase in the thickness and weight of the touchpad assembly underlying the touchpad surface, and potentially the thickness and weight of the base chassis as a whole. The illuminated portions of the touchpad provide for an aesthetic improvement as well as functional benefits without a need for increased thickness/weight of the touchpad assembly.

In other embodiments, the surface of the touchpad and the area to the left and right of the touchpad, referred to herein as palm rests, may be formed from a unitary piece of material that has a seamless surface but requires a minimum level of stiffness to support proper operation of a haptic feedback piezo assembly incorporated beneath the touchpad. Although the single glass top cover surface provides the required stiffness for supporting operation of a haptics-enabled touchpad in prior designs, the glass material of the touchpad has limited durability and is prone to damage such as chipping, cracking, and scratching. The edges of such a single substrate of glass interfacing with the outer boundaries of the base chassis, such as aluminum may have a further increase in the risk of chipping and cracking, as these outer boundaries routinely impact surrounding objects and surfaces. Thus, the use of such a single glass panel may result in low durability.

The use of composite substrate of woven glass fibers impregnated with polycarbonate material as the base chassis upper portion or the upper surface of the touchpad may address the durability and aesthetics issues presented by these conventional designs, as well as provide a dual use lightguide layer for illuminating the touchpad according to embodiments of the present disclosure. Such polycarbonate impregnated composite substrate of woven glass fibers in embodiments of the present disclosure may comprise, for example, a thermoplastic material, and may provide sufficient stiffness to support a haptics-driven touchpad assembly, a lower risk of chipping and cracking than glass, while providing a glass-like finish that is aesthetically pleasing as well as light-transmissivity to illuminate the touchpad surface. Further, such a polycarbonate impregnated composite substrate of woven glass fiber may be recyclable or contain recycled polycarbonate material for a lower manufacturing carbon-footprint, enable light diffusion throughout its thickness, allow for transmission of radiofrequency (RF) waves (e.g., RF-transparency), and have an Underwriters Laboratory (UL) 94V-0 flammability rating. In various embodiments herein, the upper surface panel of a haptics-enabled touchpad assembly and the palm rest surface panels to either side of the haptic touchpad assembly may be comprised of such a polycarbonate impregnated composite substrate of woven glass fiber. In some embodiments described herein, a unitary substrate sheet of woven glass fiber impregnated with a polycarbonate material may form the upper surface of the haptics-enabled touchpad assembly and the palm rest surface panels.

In some embodiments herein, a three-panel design may be employed to form the base chassis upper portion. In such embodiments, a touchpad surface comprising a composite substrate of woven glass fiber impregnated with a polycarbonate material may extend to the front edge or front metallic border wall of the base chassis and to the front edge of the keyboard opening. In other embodiments, the touchpad surface allowing for haptic movement may be inserted into a windowed island opening within the base chassis upper portion (e.g., as seen in the dive-board configuration described above), which may be comprised of a polycarbonate material, or other conventional plastic or metal. The touchpad surface in such an embodiment may also lie between two palm rests comprising polycarbonate material, or other conventional plastic or metal and may be supported by structures of the base chassis lower portion. In such embodiments, the use of the touchpad surface comprising a composite substrate of woven glass fiber impregnated with a polycarbonate material results in a slimmer (in the z-direction) and lighter touchpad stack up than conventional designs employing a polycarbonate material as the touchpad surface and provides a dual use lightguide layer for illuminating the touchpad.

Because such a polycarbonate impregnated composite substrate of woven glass fiber has greater durability than traditional glass panels, the edges of the touchpad, neighboring palm rests (or unitary sheet comprising the touchpad and both palm rests) may be used without encountering the durability concerns encountered when using a glass panel, as described above. A thinner yet rigid and light touchpad surface layer may be formed with light transmissive properties and eliminate a lightguide layer according to embodiments herein. Embodiments of the present disclosure employ a three-panel haptic touchpad and palm rest base chassis assembly, a unitary haptic touchpad and palm rest base chassis assembly, or a windowed haptic touchpad assembly providing an aesthetically pleasing, and durable upper surface panel(s) with exterior edges extending to the outer boundary of the base chassis. In some embodiments, an aluminum or other material band may form the vertical walls defining the outer boundary of the base chassis (e.g., a tray), with the three-panel upper surface inserted within these edges as an inlay. The panel(s) may be comprised of the same polycarbonate impregnated composite substrate of woven glass fiber that provides a glass-like texture, may be different materials, or may allow for base chassis designs other than the windowed island touchpad design with an illuminated haptic touchpad and a thinner touchpad stack. The upper surface panel of the haptic touchpad assembly (e.g., the portion manipulated by the user) and both the right and left palm rest support surface panels neighboring the touchpad upper surface panel may form the three panels in some embodiments, which may also extend away from the user to form a portion of an opening within the base chassis upper portion for insertion of a keyboard. In another embodiment, a unitary substrate may form the touchpad surface panel and both palm rest surface panels. These designs may provide a glass-like finish across the majority of the base chassis upper portion (e.g., the touchpad and palm rest surfaces) of uniform texture that is illuminated without the need for another lightguide layer and extends to the front, left, and right outer boundaries of the base chassis upper portion and to the bottom edge of the keyboard.

The polycarbonate impregnated composite substrate of woven glass fiber forming the touchpad surface panel and palm rest surface panels in various embodiments described herein may be light diffusing, as described, thus negating the need for a separate lightguide layer within the touchpad and palm rest assembly. Many touchpad and palm rest assemblies incorporate backlit icons on the surface panels that users may select to perform various discrete tasks, such as altering volume, or muting the microphone or speakers of the information handling system, for example. In order to provide such icon backlighting in existing systems employing either glass or polycarbonate materials described above, a lightguide layer may be employed to guide light from a light emitting diode (LED) operably connected to the printed circuit board assembly (PCBA) and the touchpad surface panel. In embodiments of the present disclosure that employ the polycarbonate impregnated composite substrate of woven glass fiber, such a separate light guide layer may not be necessary, as the substrate itself is light diffusing. The woven glass impregnated with polycarbonate material may also include addition in the polycarbonate such as titanium dioxide to provide additional spectral benefits such as uniform light diffusion in some embodiments. An opening may be etched within the substrate in various embodiments described herein, for insertion of the LED beneath the woven glass substrate impregnated with polycarbonate material on one or more icon openings etched in an inked layer top of the substrate. By removing the separate lightguide layer within the haptic touchpad assembly in such embodiments, the total thickness of the haptic touchpad assembly may be decreased, saving space within the chassis.

Although the top surface of the haptic touchpad assembly may extend to the front edge of the base chassis in embodiments of the present disclosure, underlying layers of the haptic touchpad assembly and piezo assembly may be set back from the front edge of the base chassis to provide an open area for insertion of a radiofrequency (RF) antenna. Many information handling systems employ a plurality of RF antennas for communication in more than one communication standard or frequency range (e.g., WWAN, WLAN, Bluetooth®, NFC). Placement of these antennas without interference is a challenge. Thus, there is a need to distribute antennas around the edges of the base chassis where possible. In conventional systems, RF antennas cannot be placed directly under the haptic touchpad assembly situated nearest the front edge of the base chassis because some conventional touchpad material, such as metal, PCBA, mechanical switches or supporting structure may inhibit transmission of RF waves. Because the top surface of the touchpad and palm rest assembly in embodiments of the present disclosure employ a polycarbonate impregnated composite substrate of woven glass fiber that is RF-transparent, antennas may now be placed on the front edge of the base chassis, located nearest the user, at one or more radiofrequency window locations. This may result in decreased interference among multiple antennas and more available solutions for distribution of antennas within the chassis, or the ability to add an additional antenna not previously enclosed within the base chassis in conventional systems. In such a way, a touchpad and palm rest base chassis assembly employing a light-diffusing polycarbonate impregnated composite substrate of woven glass fiber may extend the edges of the touchpad and neighboring palm rests to the outer borders of the base chassis with a vertical exterior wall formed by a metal, without encountering the durability concerns encountered when using a glass panel, decrease thickness of the assembly, improve antenna signal strength, and potentially minimize the manufacturing carbon footprint.

FIG. 1 illustrates an information handling system 100 according to several aspects of the present disclosure. In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. The information handling system 100 may include a memory 102, (with computer readable medium 186 that is volatile (e.g. random-access memory, etc.), nonvolatile memory (read-only memory, flash memory etc.) or any combination thereof), one or more hardware processing resources, such as a central processing unit (CPU), a graphics processing unit (GPU), a Visual Processing Unit (VPU) or a Hardware Accelerator, any one of which may be the hardware processor 101 illustrated in FIG. 1, hardware control logic, or any combination thereof. Additional components of the information handling system 100 may include one or more storage devices 103 or 107, a wireless network interface device 160, one or more communications ports for communicating with external devices, as well as various input and output (I/O) devices 110, such as a mouse, a keyboard 111, a touchpad within the haptic touchpad assembly 190, or any combination thereof. A power management unit 104 supplying power to the information handling system 100, via a battery 105 or an alternating current (A/C) power adapter 106 may supply power to one or more components of the information handling system 100, including the hardware processor 101, or other hardware processing resources executing code instructions, the wireless network interface device 160, a static memory 103 or drive unit 107, a, a video display 109, or other components of an information handling system. The video display 109 in an embodiment may function as a liquid crystal display (LCD), an organic light emitting diode (OLED), a flat panel display, or a solid-state display. The information handling system 100 may also include one or more buses (e.g., 108) operable to transmit communications between the various hardware components.

The information handling system 100 may further include a haptic touchpad assembly 190 mounted within a base chassis of the information handling system 100, which may further incorporate a touchpad printed circuit board assembly (PCBA) 120 and a keyboard control assembly 130, as also described in greater detail below with respect to FIG. 2. The haptic touchpad assembly 190 in an embodiment may incorporate a haptics-enabled piezo assembly, which may further be controlled by the touchpad PCBA 120. In some embodiments, the touchpad PCBA 120 may also communicate with the keyboard 111 via a USB link 113. The top surface panel of the haptic touchpad assembly 190 in an embodiment may comprise a composite substrate of woven glass fiber impregnated with polycarbonate material to provide sufficient stiffness for operation of the haptic touchpad assembly 190 and a durable, aesthetically pleasing glass-like finish that matches neighboring palm rest surface panels, as described in greater detail below with respect to FIG. 3A. In other embodiments, the touchpad surface in may be disposed between two palm rests comprising composite substrate of woven glass fiber impregnated with polycarbonate material, a polycarbonate material, or other conventional plastic or metal. In still other embodiments, the touchpad surface allowing for haptic movement may be inserted into a windowed island opening within the base chassis upper portion (e.g., as seen in the dive-board configuration described above), which may be comprised of a polycarbonate material, or other conventional plastic or metal.

Further, this top surface panel of the haptic touchpad assembly 190 may be transparent to the transmission of radiofrequency (RF) waves to or from the antenna systems 163 of the network interface device 160. As described in greater detail below with respect to FIGS. 4H, 4I, and 6, this may allow for increased signal strength at the antenna systems 163, due to one or more available antenna windows in the base chassis upper portion cover and even use of additional antennas, with decreased interference from multiple antennas transceiving in similar frequency ranges within the same base chassis for the information handling system 100.

The information handling system 100 may execute code instructions 187, via one or more hardware processing resources, that may operate on servers or systems, remote data centers, or on-box in individual client information handling systems 100 according to various embodiments herein. In some embodiments, it is understood any or all portions of code instructions 187 may operate on a plurality of information handling systems 100.

The information handling system 100 may include a hardware processor 101 such as a central processing unit (CPU), a graphics processing unit (GPU), a Visual Processing Unit (VPU), or a hardware accelerator, embedded controllers or hardware control logic or some combination of the same. Any of the hardware processing resources may operate to execute code that is either firmware or software code. Moreover, the information handling system 100 may include memory such as main memory 102, static memory 103, containing computer readable medium 186 storing instructions 187. In other embodiments the information handling system 100 may represent a server information handling system executing operating system (OS) software, application software, BIOS software, or other software applications or drivers detectable by hardware processor type 101.

The disk drive unit 107 and static memory 103 may also contain space for data storage in a computer readable medium 186. The instructions 187 in an embodiment may reside completely, or at least partially, within the main memory 102, the static memory 103, and/or within the disk drive 107 during execution by the hardware processor 101. The information handling system 100 may also include one or more buses 108 operable to transmit communications between the various hardware components such as any combination of various input and output (I/O) devices 110, the haptic touchpad assembly 190, the keyboard 111, palm rests 112, or the like.

The network interface device 160 may provide connectivity of the information handling system 100 to the network 170 via a network AP in an embodiment. The network 170 in some embodiments may be a wired local area network (LAN), a wireless personal area network (WPAN), a public Wi-Fi communication network, a private Wi-Fi communication network, a public WiMAX communication network, or other non-cellular communication networks. In other embodiments, the network 170 may be a wired wide area network (WAN), a 4G LTE public network, or a 5G communication network, or other cellular communication networks. Connectivity to any of a plurality of networks 170, one or more APs for those networks, or to a docking station in an embodiment may be via wired or wireless connection. In some aspects of the present disclosure, the network interface device 160 may operate two or more wireless links. In other aspects of the present disclosure, the information handling system 100 may include a plurality of network interface devices, each capable of establishing a separate wireless link to network 170, such that the information handling system 100 may be in communication with network 170 via a plurality of wireless links.

The network interface device 160 may operate in accordance with any cellular wireless data communication standards. To communicate with a wireless local area network, standards including IEEE 802.11 WLAN standards, IEEE 802.15 WPAN standards, WiMAX, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11 a/h/j/n/ac/ax/be including Wi-Fi 6, Wi-Fi 6c, and the emerging Wi-Fi 7 standard. It is understood that any number of available channels may be available in WLAN under the 2.4 GHZ, 5 GHZ, or 6 GHZ bands which may be shared communication frequency bands with WWAN protocols or Bluetooth® protocols in some embodiments.

The network interface device 160, in other embodiments, may connect to any combination of cellular wireless connections including 2G, 2.5G, 3G, 4G, 5G or the like from one or more service providers or privately administered by an enterprise. Utilization of radiofrequency communication bands according to several example embodiments of the present disclosure may include bands used with the WWAN standards, which may operate in both licensed and unlicensed spectrums. More specifically, the network interface device 160 in an embodiment may transceive within radio frequencies associated with the 5G New Radio (NR) Frequency Range 1 (FR1) or Frequency Range 2 (FR2). NRFR1 may include radio frequencies below 6 GHZ, associated with 4G LTE and other standards predating the 5G communications standards. NRFR2 may include radio frequencies above 6 GHZ, made available within the emerging 5G communications standard. Communications within NRFR1 may be enabled through the use of either an eNodeB executing an evolved packet core of an existing LTE system, or a Next Generation Node B (gNodeB) executing the next generation packet core of the 5G cellular standard. Frequencies related to the 5G networks may include high frequency (HF) band, very high frequency (VHF) band, ultra-high frequency (UHF) band, L band, S band, C band, X band, Ku band, K band, Ka band, V band, W band, and millimeter wave bands.

In an embodiment, the network interface device 160 may be communicatively coupled to one or more antenna systems 163 used to provide one or more separate communication channels to the network 170. Such communications channels may be found in any communication network described herein. The antennas 163 may support Wi-Fi 6, Wi-Fi 6e, the emerging Wi-Fi 7, or a 5G wireless communication protocol so that relatively higher amounts of data may be transceived by the information handling system 100 to any communication network to which the information handling system 100 is communicatively coupled in some embodiments.

The wireless controller 162 may execute instructions for monitoring wireless link state information, wireless link configuration data, network slice data, or other input data to generate channel estimation and determine antenna radiation patterns. For example, the wireless controller 162 in an embodiment may gather beacon data received from one or more nearby access points (APs) for the network 170 describing channels available for communication with that AP, as well as various current traffic metrics for communications on those channels. More specifically, such beacon information may provide a relative signal strength indicator (RSSI), identification of the network 170 as private or public, identification of the network 170 as compatible with multiple user, multiple input, multiple output (MU-MIMO) communications, high available data rate, levels of channel contention, and current load of communications at the AP. Wireless controller 162 may also control selection from among an available plurality of antennas 163 via antenna switching or adjust antenna matching or antenna directionality in some cases for antenna systems 173. The network interface device 160 in an embodiment may further include a radio subsystem 161 which may operate to modulate and demodulate signals transceived within a WWAN or WLAN format, set signal transmission power levels or sensitivity to signal reception, select channels or frequency bands, and conduct other functions in support of a wireless transmission from the information handling system 100 to the communication network 170.

In some embodiments, hardware executing software or firmware, dedicated hardware implementations such as application specific integrated circuits, programmable logic arrays and other hardware devices may be constructed to implement one or more of some systems and methods described herein. Applications that may include the hardware processing resources executing systems of various embodiments may broadly include a variety of electronic and computer systems. One or more embodiments described herein may implement functions using two or more specific interconnected hardware modules or devices with related control and data signals that may be communicated between and through the hardware modules, or as portions of an application-specific integrated circuit. Accordingly, the present embodiments encompass hardware processing resources executing software or firmware, or hardware implementations.

In accordance with various embodiments of the present disclosure, the methods described herein may be implemented by firmware or software programs executable by a hardware controller, a hardware processor system, or other hardware processing resources. Further, in an exemplary, non-limited embodiment, implementations may include distributed processing, component/object distributed processing, and parallel processing. Alternatively, virtual computer system processing may be constructed to implement one or more of the methods or functionalities as described herein. Various software modules comprising application instructions 187 may be coordinated by an operating system (OS), and/or via an application programming interface (API). An example operating system may include Windows®, Android®, and other OS types. Example APIs may include Win 32, Core Java API, or Android APIs. Application instructions 187 may also include any application processing drivers, or the like executing on information handling system 100.

Main memory 102 may contain computer-readable medium (not shown), such as RAM in an example embodiment. An example of main memory 102 includes random access memory (RAM) such as static RAM (SRAM), dynamic RAM (DRAM), non-volatile RAM (NV-RAM), or the like, read only memory (ROM), another type of memory, or a combination thereof. Static memory 103 may contain computer-readable medium (not shown), such as NOR or NAND flash memory in some example embodiments. The instructions, parameters, and profiles 187 may be stored in static memory 103, or the drive unit 107 on a computer-readable medium 186 such as a flash memory or magnetic disk in an example embodiment.

While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a hardware processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In some embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware, or as software or firmware executing on a hardware processing resource. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The hardware system, hardware device, hardware controller, or hardware module may execute software, including firmware embedded at a device, such as an Intel® brand hardware processor, ARM® brand hardware processors, Qualcomm® brand hardware processors, or other hardware processors and chipsets, or other such device, or software capable of operating a relevant environment of the information handling system. The hardware system, hardware device, hardware controller, or hardware module may also comprise a combination of the foregoing examples of hardware, or hardware processors executing firmware or software. In an embodiment an information handling system 100 may include an integrated circuit or a board-level product having portions thereof that may also be any combination of hardware and hardware executing software. Hardware devices, hardware modules, hardware resources, or hardware controllers that are in communication with one another need not be in continuous communication with each other, unless expressly specified otherwise. In addition, hardware devices, hardware modules, hardware resources, or hardware controllers that are in communication with one another may communicate directly or indirectly through one or more intermediaries.

Figure 2:
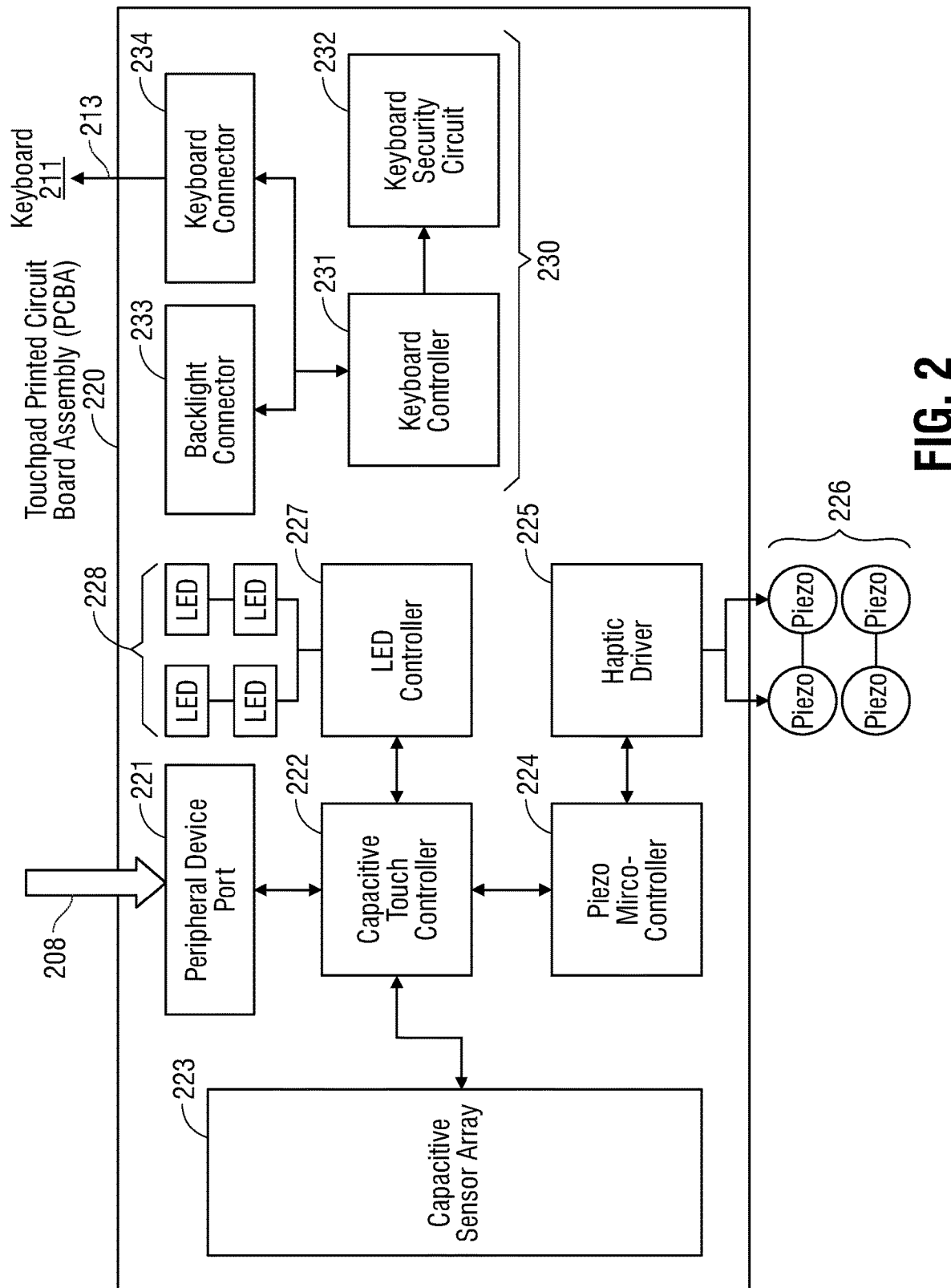
FIG. 2 is a block diagram illustrating a touchpad printed circuit board assembly (PCBA) according to an embodiment of the present disclosure.

FIG. 2 is a block diagram illustrating a touchpad printed circuit board assembly (PCBA) operably coupled to a touchpad, a keyboard, and an internal bus of an information handling system according to an embodiment of the present disclosure. As described herein, the information handling system (e.g., FIG. 1 at 100) may include a haptic touchpad assembly mounted within a base chassis, and incorporating a touchpad printed circuit board assembly (PCBA) 220. The touchpad PCBA 220 may be operably coupled to various components of the information handling system (e.g., 100 of FIG. 1) via the bus 208 (also described in FIG. 1 as 108) and peripheral device port 221.

The touchpad PCBA 220 in an embodiment may house operational circuitry for control of various input/output peripheral devices, such as a touchpad, a keyboard, various light emitting diodes (LEDs) 228, and a piezo-haptic assembly and one or more piezo actuators 226 which may haptically actuate and may also sense force applied in various embodiments herein. In other embodiments, a Linear Resonance Actuator (LRA) motor assembly may be used instead of a piezo-haptic assembly for haptic feedback. In an example embodiment employing a piezo-haptic assembly, the touchpad PCBA 220 in an embodiment may include a capacitive sensor array 223 capable of sensing touch by a user along the touchpad surface panel through changes in capacitance to operate as a cursor control device. The capacitive sensor array 223 in an embodiment may identify when such touch has occurred, and a location of such touch along the touchpad surface panel (e.g., as described in greater detail below with respect to FIG. 3A). In some embodiments, the capacitive sensor array 223 may also associate in capacitive touch controller 222 a location of touch with a light-emitting icon (e.g., as also described in greater detail below with respect to FIG. 3A) that may be further associated with a command instruction for execution by the hardware processor (e.g., 101 or FIG. 1), the piezo micro-controller 224, or various peripheral devices such as speakers or microphones (e.g., volume up/down, microphone mute). The capacitive sensor array 223 in an embodiment may transmit notification of detected touch along the touchpad surface panel and any associated command instructions locations (e.g., associated with touch of a specific light-emitting icon) to the capacitive touch controller 222 to register an associated command, cursor control, selection, or other touchpad function in an embodiment.

In an embodiment, the capacitive touch controller 222 may be an integrated circuit or microcontroller, such as the Gen6 touch controller platform from Cirque®, for example. The capacitive touch controller 222 in an embodiment may receive input from the capacitive sensor array 222 and transmit such instructions to processors or controllers for execution of associated command instructions. For example, the capacitive touch controller 222 in an embodiment may communicate with an LED controller 227 to control light emitted from one or more LEDs 228. In an embodiment described in greater detail below with respect to FIG. 3A, such an LED 228 may be situated beneath a light-emitting icon situated along the touchpad surface panel that may be selected by a user via touch sensed by the capacitive sensor array 223.

As another example, an instruction received from the capacitive sensor array 223 for movement of a cursor in accordance with a sensed touch by the user along the touchpad surface panel in an embodiment may be determined by the capacitive touch controller 222 and transmitted to the hardware processor (e.g., 101 of FIG. 1) of the information handling system, or to the video display (e.g., 109 of FIG. 1) via the peripheral device port 221 and the bus 208. In another embodiment, an instruction received from the capacitive sensor array 223 for initiation of haptic feedback by the piezos 226 in response to a sensed touch by the user along a light-emitting icon (e.g., as described in greater detail below with respect to FIG. 3A) may be transmitted to the piezo micro-controller 224 and haptic driver 225. In still another embodiment, instructions for initiation of piezos 226 may be received via the peripheral device port 221 and bus 208 from the hardware processor (e.g., 101 of FIG. 1) in response to execution of various software applications (e.g., 187 of FIG. 1). In yet other embodiments, the piezo actuators 226 may be used to detect force applied with the piezo micro controller 224 and also provide the haptic feedback from the piezo microcontroller 224 to the piezo actuators 226. In other embodiments, the haptic feedback may be provided by structures other than piezos, such as linear response actuator assemblies or voice coil magnetic haptic assemblies. In such other embodiments, 226 may represent linear response actuators, or voice coil magnetic haptic actuators, respectively.

The piezo micro-controller 224 in an embodiment may control one or more piezo actuators 226 via a haptic driver 225. In an example embodiment, the piezo micro-controller 224 may be a 32-bit microcontroller (MCU) from STMicroelectronics®. The piezo micro-controller 224 in an embodiment may operate to store haptic waveforms, determine whether sufficient downward force on the touchpad surface panel has been detected by the capacitive sensor array 223 as a force sensor or by the piezo actuators 226 themselves to trigger a haptic response via the piezo actuators 226, and transmit specific instructions for initiation or firing of the piezo actuators 226 to a haptic feedback response that may be sensed by various portions of the user's hand that are in contact with the touchpad surface panel or even a palm rest location in some embodiments. Force may be detected by the haptic driver 225 and piezo microcontroller 224 in some embodiments. The haptic firing instructions may then be transmitted to the haptic driver 225, which may operate to apply electrical pulses in accordance with the stored haptic waveforms (e.g., pulsing, steady vibration, clicking) to one or more of the piezo actuators 226. In an embodiment, the piezo actuators 226 may be situated along various points beneath the touchpad surface panel or palm rest panel such that specific piezo actuators 226 are meant to cause haptic feedback felt by specific portions of the user's hands. For example, one of the piezo actuators 226 may be situated in the lower left-hand portion of the touchpad surface panel to provide haptic feedback to a user's left thumb. The piezo micro-controller 224 and the haptic driver 225 in an embodiment may fire only this lower-left piezo in response to sensed touch within the lower-left hand portion of the touchpad surface panel by the capacitive sensor array 223, for example, or in response to command instructions received from the hardware processor (e.g., 101 of FIG. 1) due to execution of various software applications (e.g., firing of a weapon within a video game).

The touchpad PCBA 220 in some embodiments may further include a keyboard controller 230 in communication with a keyboard 211 via USB link 213. Keyboard controller 230 (e.g., ECE-1117) in an embodiment may operate to receive input from the keyboard 211 (e.g., sensed pressing of various keys by a user), as well as control of a backlight connector 233, a keyboard connector 234, and a keyboard security circuit 232. In alternative embodiments, keyboard controller 230 and keyboard security circuit 232 could be disposed with the keyboard 211 or elsewhere in the information handling system and not on PCBA 220.

Figure 3A:
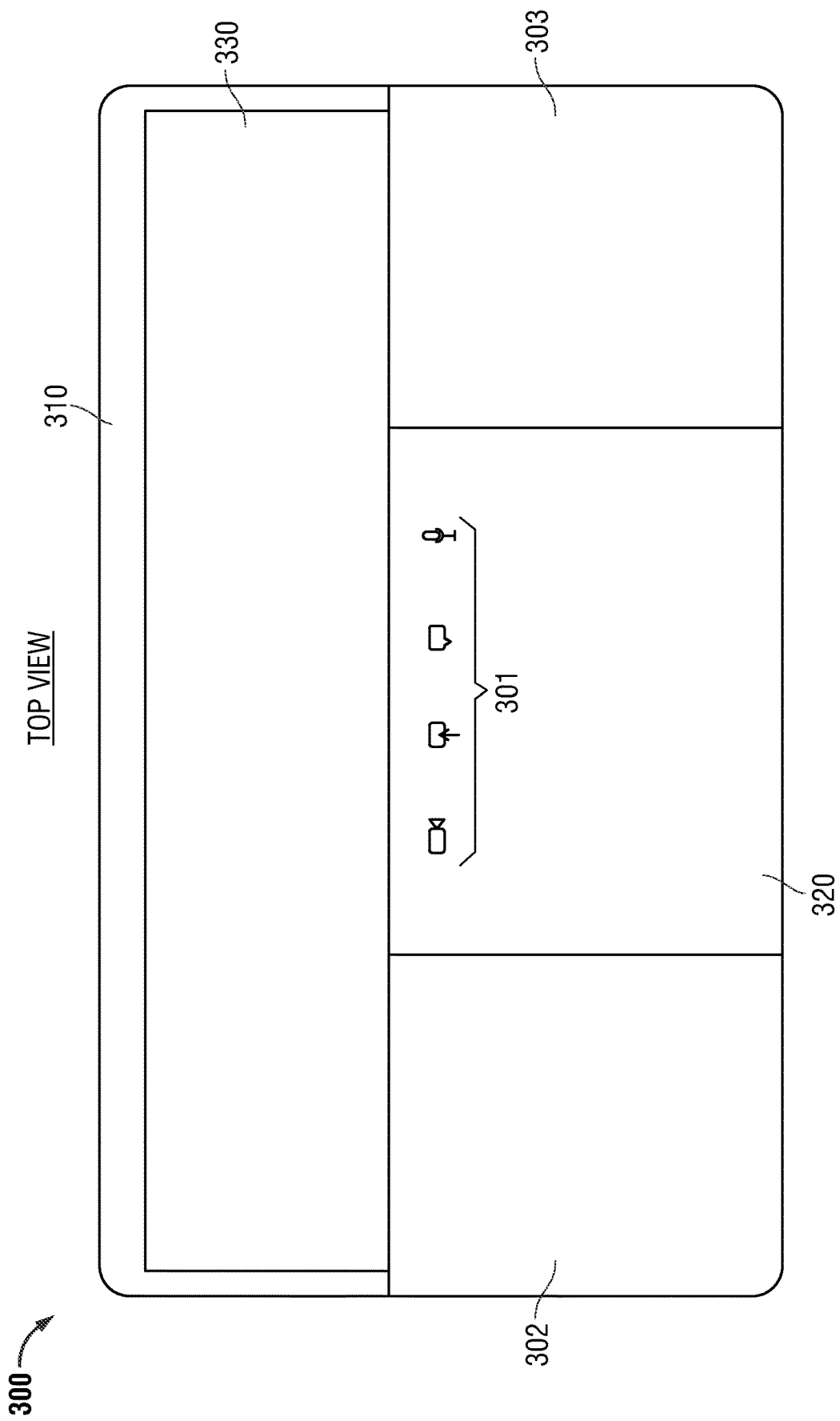
FIG. 3A is a graphical diagram illustrating a top view of a three-panel touchpad and palm rest assembly according to an embodiment of the present disclosure.

FIG. 3A is a graphical diagram illustrating a top view of a base chassis for an information handling system including a three-panel touchpad and palm rest assembly according to an embodiment of the present disclosure. An information handling system in an embodiment, or portions thereof, may be enclosed or housed within a base chassis that may be formed by joining a base chassis upper portion 310 with a base chassis lower portion (not shown). The base chassis upper portion 310 in an embodiment may include an opening 330 for insertion of a keyboard, as well as an opening (e.g., as described below with respect to FIG. 4C) for insertion of a haptic touchpad assembly that includes a touchpad surface panel 320. As described in greater detail below with respect to FIG. 4E, a left palm rest surface panel 302 and a right palm rest surface panel 303 may be mounted to palm rest support surfaces (not shown) of the base chassis upper portion 310 to form a three-panel touchpad and palm rest assembly embodiment as shown.

As described herein, many conventional base chasses are manufactured by inserting a keyboard and a dive-board touchpad into openings formed through the upper portion of the base chassis, such that all four sides of the touchpad and the keyboard are surrounded by the upper portion of the base chassis. In such a dive-board-type approach, at least one edge of the touchpad assembly (e.g., rear edge lying closest to the keyboard) may need to be firmly attached to the base chassis to provide a dive-board movement of the touchpad assembly to trigger a switch for clicking or a selection action. This may also cause an inability to physically depress or "click" a portion of the touchpad situated closest to the edge affixed to the base chassis. The dive-board-type design may also limit the area of the touchpad surface available for actuation.

Many conventional base chasses employ a polycarbonate-based substrate for the upper portion of the base chassis and the touchpad surface. The base chassis upper portion in such a conventional chassis, for example, may use a unitary piece of material (e.g., polycarbonate resin plastics, aluminum or other metals), as a top surface of a touchpad. A polycarbonate-based substrate alone requires the top surface of a touchpad to be supported with a lower support structure or thicker touchpad surface layer, because the polycarbonate-based substrate alone cannot provide sufficient stiffness required for haptic touchpad operation. Metal touchpad surfaces may not or cannot conduct light and require a lightguide layer. In other words, conventional base chasses may employ a haptic touchpad assembly having a surface material that requires an increase in the thickness and weight of the touchpad assembly underlying the touchpad surface, and potentially the thickness and weight of the base chassis as a whole. The illuminated portions of the touchpad provide for an aesthetic improvement as well as functional benefits without a need for increased thickness/weight of the touchpad assembly.

In other conventional base chasses, the surface of the touchpad and the area to the left and right of the touchpad, referred to herein as palm rests, may be formed from a unitary piece of glass that has a seamless surface. Although the single glass top cover surface provides the required stiffness for supporting operation of a haptics-enabled touchpad, the glass material of the touchpad has limited durability and is prone to damage such as chipping, cracking, and scratching. Extending the edges of such a single substrate of glass to the outer boundaries of the base chassis or to the keyboard may further increase the risk of chipping and cracking, as these outer boundaries routinely impact surrounding objects and surfaces. Thus, the use of such a single glass panel may result in low durability.

Use of a polycarbonate impregnated composite substrate of woven glass fiber to form a touchpad surface 320, a left palm rest surface panel 302 and a right palm rest surface panel 303 in an embodiment may provide sufficient stiffness to support a haptics-driven touchpad assembly, and provide a lower risk of chipping and cracking than glass, while providing a glass-like finish that is aesthetically pleasing. Use of the polycarbonate impregnated composite substrate of woven glass fiber to form the touchpad surface 320 in an embodiment may provide for a thin but rigid material of woven glass fiber impregnated with polycarbonate for a top surface 320 of a haptic touchpad. This thin but rigid touchpad surface 320 may be usable with a haptic touchpad stack up for providing effective haptic feedback as compared to other materials. Further, the polycarbonate impregnated composite substrate of woven glass fiber to form the touchpad surface 320 may be rigid enough to detect force via piezo actuators situated below the touchpad surface 320 in some embodiments. Further, the touchpad surface layer 320 of woven glass fiber impregnated with polycarbonate material may be optically transmissive, such that an additional lightguide layer may be eliminated to provide touchpad illumination in an embodiment. The woven glass impregnated with polycarbonate material may also include additives in the polycarbonate such as titanium dioxide to provide additional spectral benefits such as uniform light diffusion for illuminated areas or button locations in some embodiments.

Figure 4B:
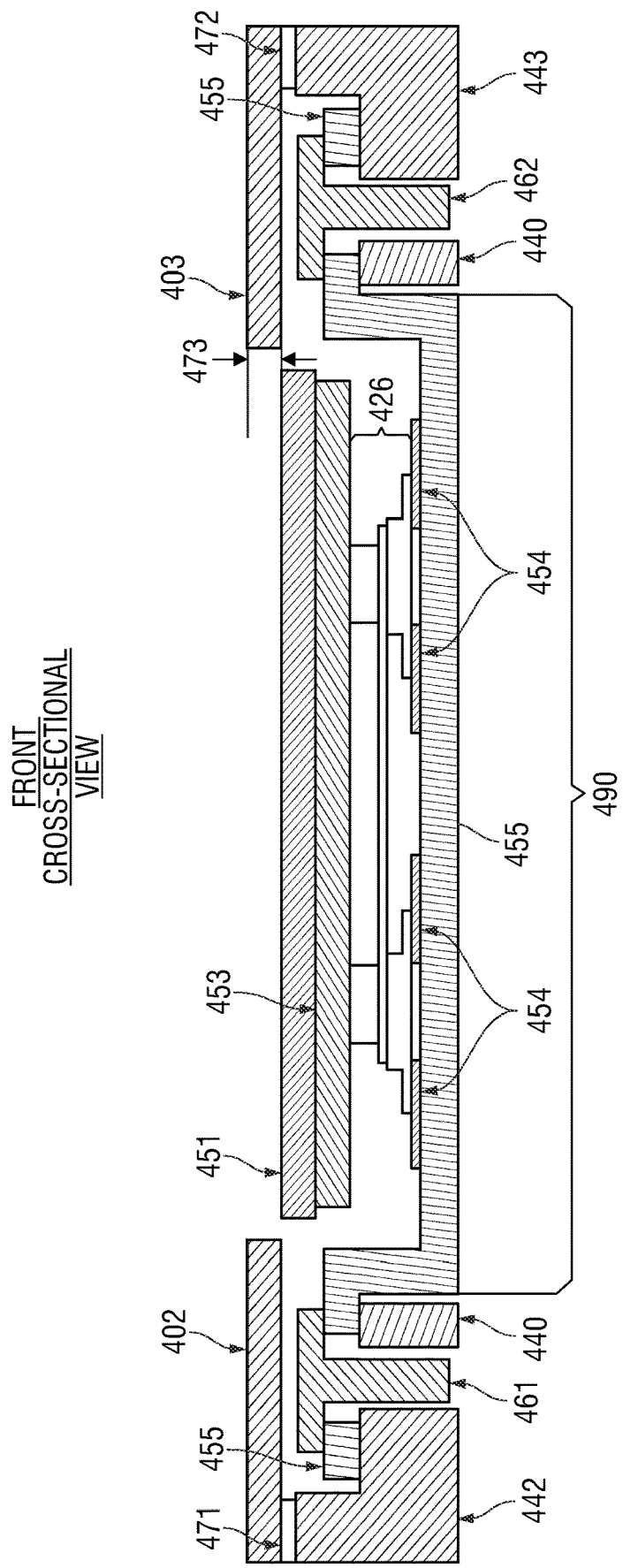
FIG. 4B is a graphical diagram illustrating a front cross-sectional view of a haptic touchpad assembly mechanically and operatively coupled to a base chassis upper portion according to an embodiment of the present disclosure.
Figure 4C:
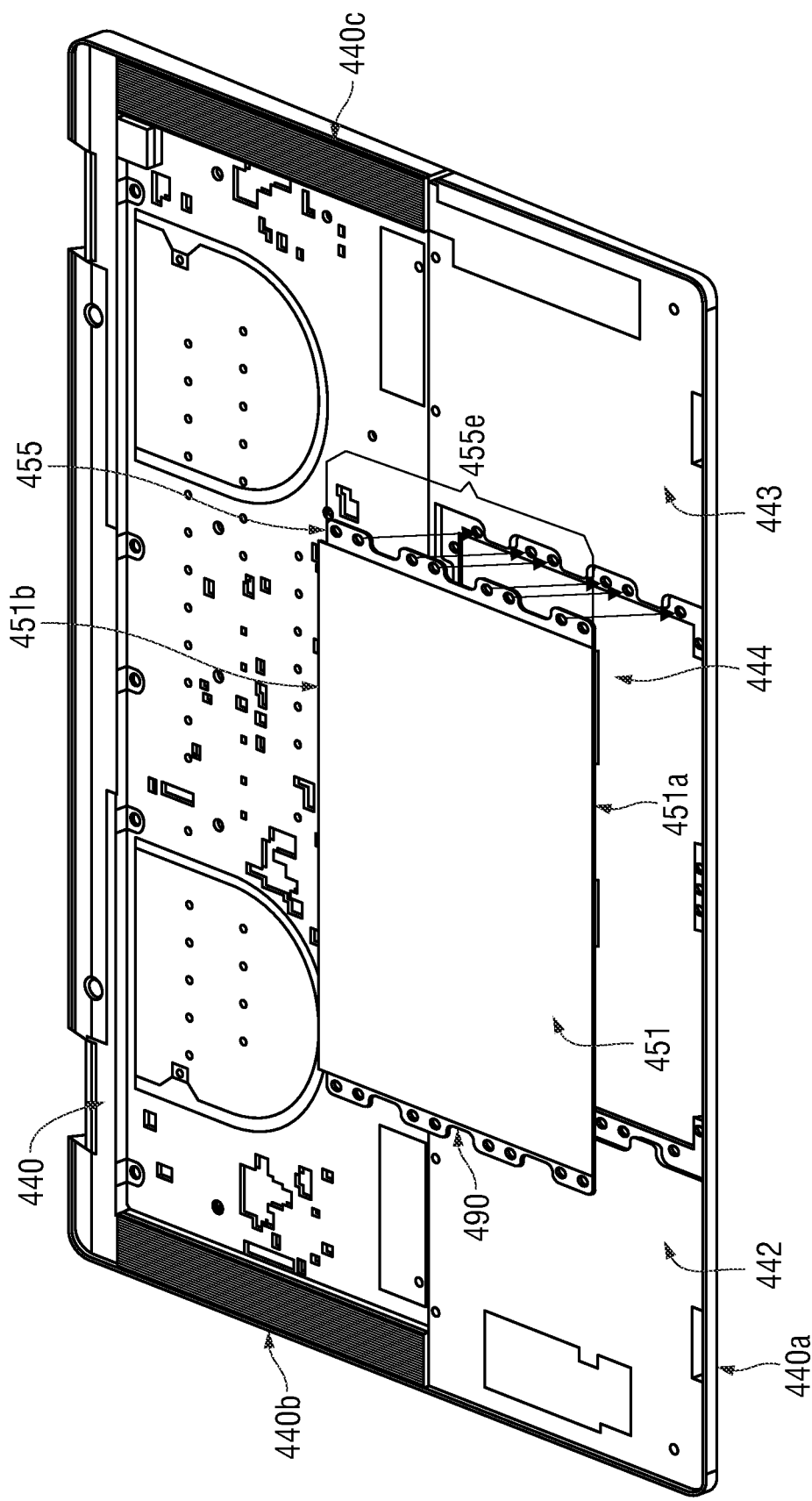
FIG. 4C is a graphical diagram illustrating a perspective view of a haptic touchpad assembly inserted within a base chassis upper portion according to an embodiment of the present disclosure.
Figure 4E:
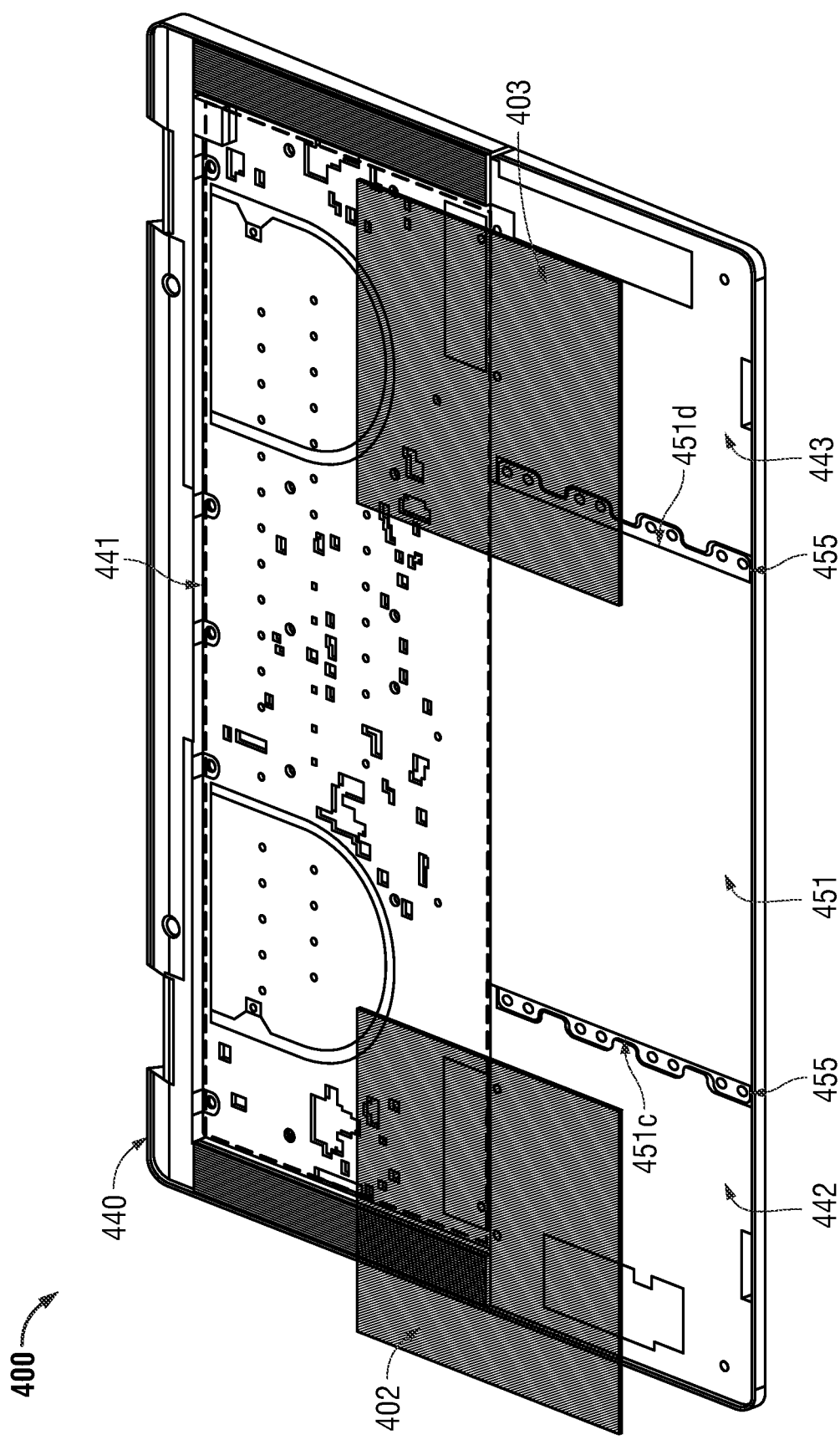
FIG. 4E is a graphical diagram illustrating a perspective view of a touchpad and palm rests with a top portion base chassis assembly according to an embodiment of the present disclosure.
Figure 4F:
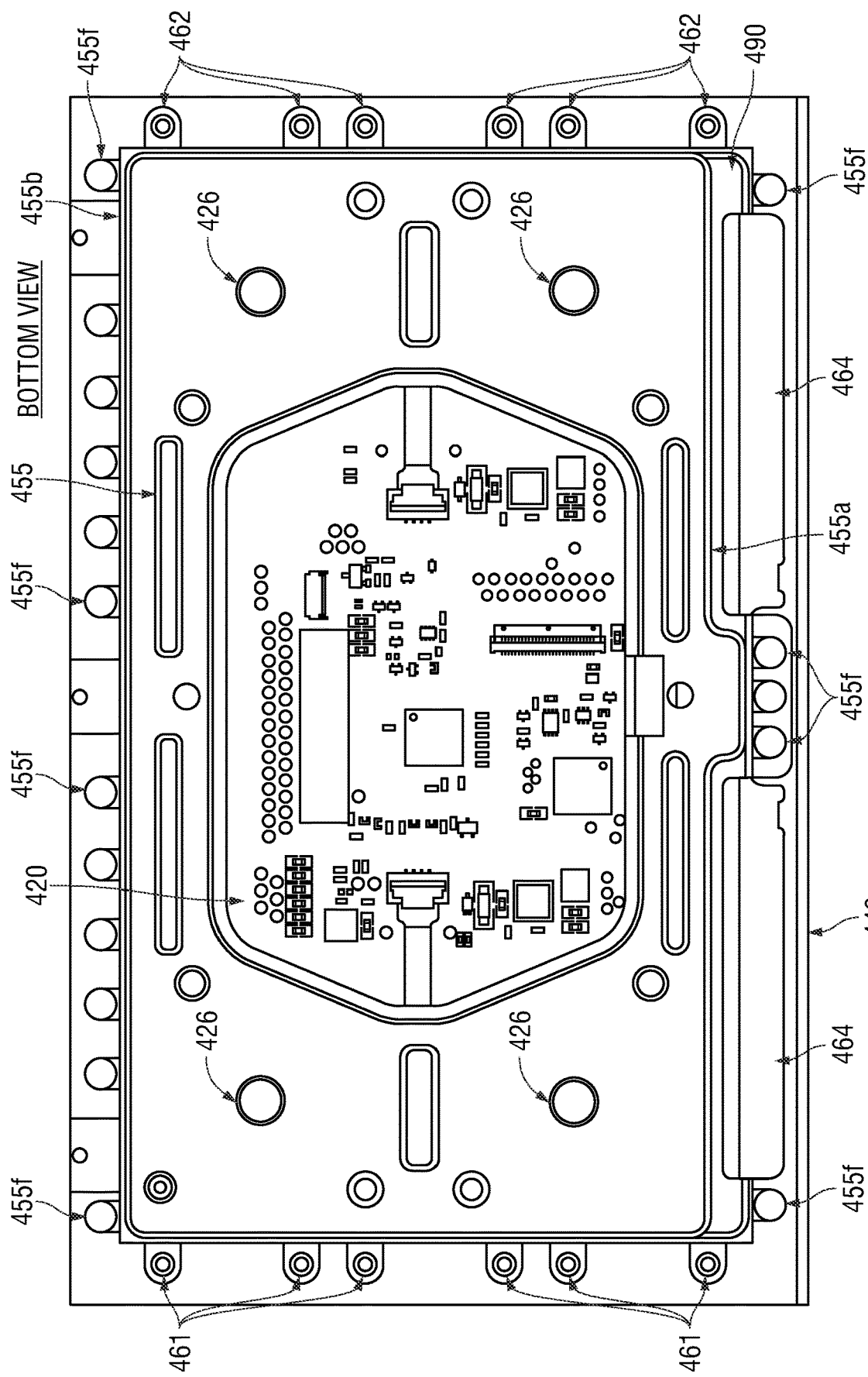
FIG. 4F is a graphical diagram illustrating a bottom view of a support bracket of a haptic touchpad assembly mechanically and operatively coupled to a base chassis upper portion according to an embodiment of the present disclosure.
Figure 4G:
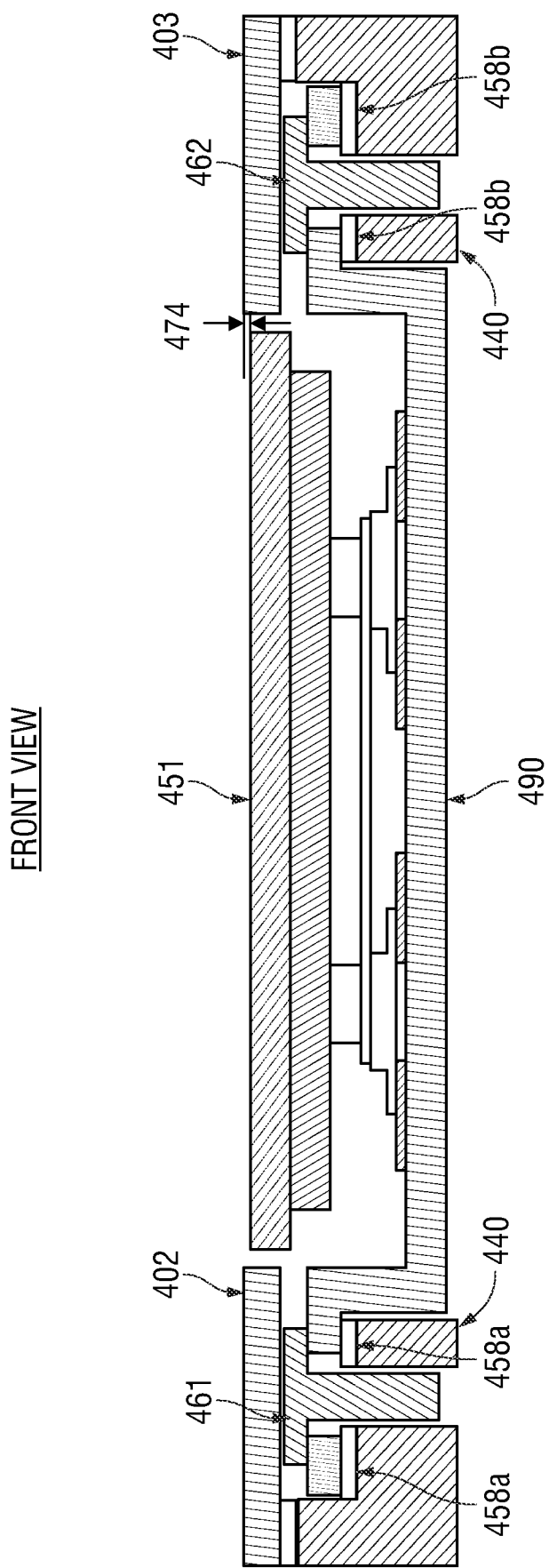
FIG. 4G is a graphical diagram illustrating a front cross-sectional view of a haptic touchpad assembly mechanically and operatively coupled to a base chassis upper portion using shims according to an embodiment of the present disclosure.
Figure 4H:
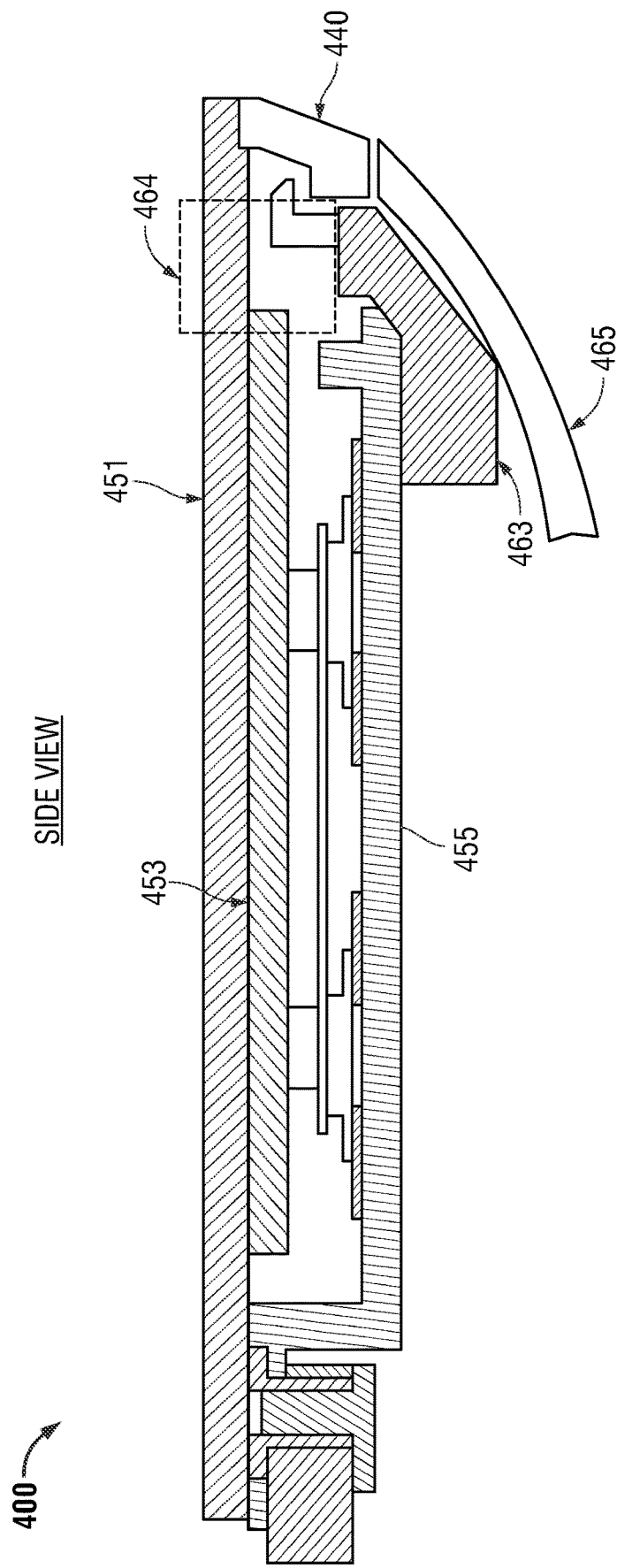
FIG. 4H is a graphical diagram illustrating a side cross-sectional view of a radiofrequency (RF) transparent zone within the base chassis according to an embodiment of the present disclosure.
Figure 4I:
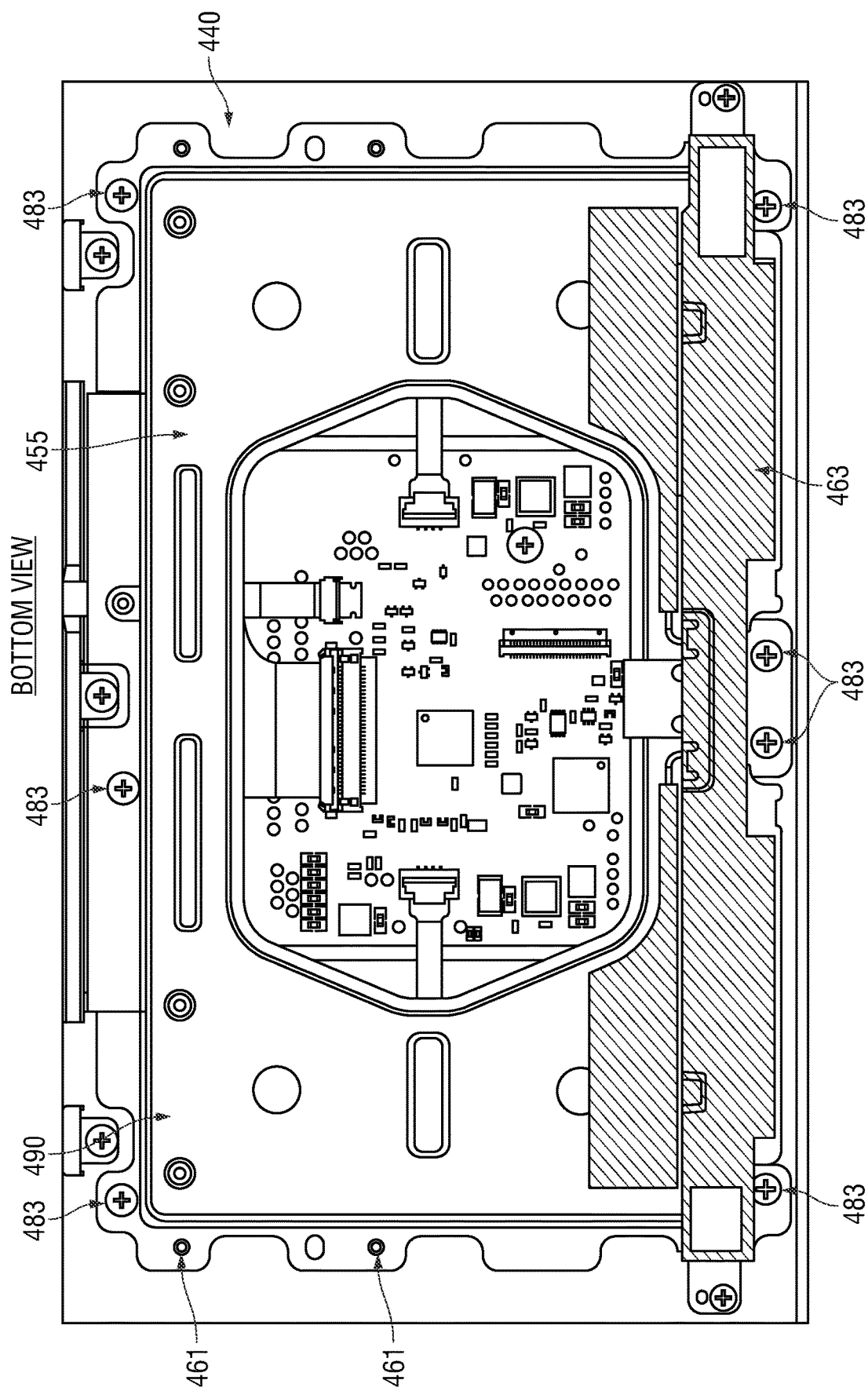
FIG. 4I is a graphical diagram illustrating a bottom view of an antenna disposed beneath a haptic touchpad assembly according to an embodiment of the present disclosure.
Figure 4J:
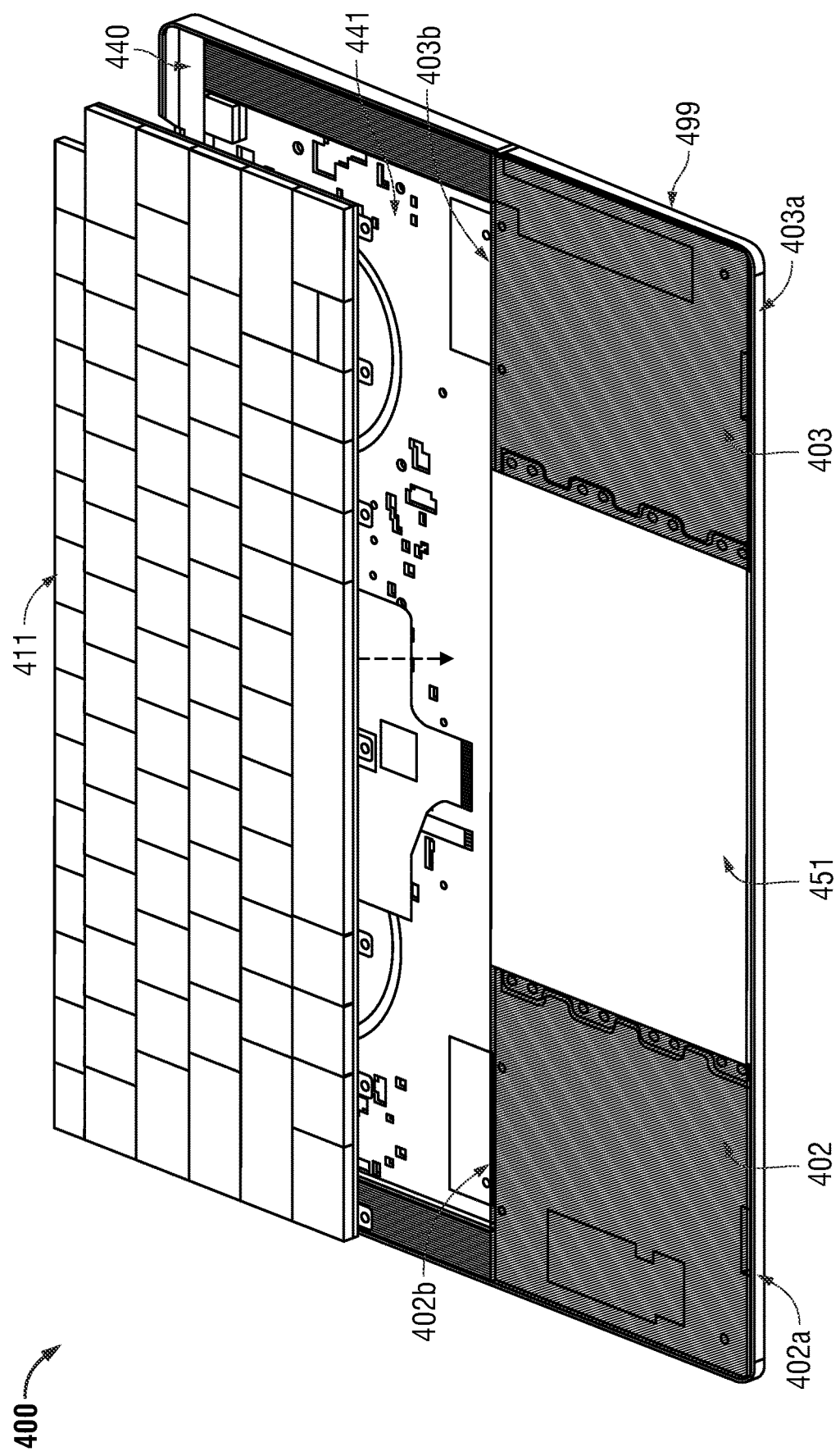
FIG. 4J is a graphical diagram illustrating a perspective view of a touchpad and palm rest with a top portion base chassis assembly for insertion of a keyboard according to an embodiment of the present disclosure.

Because such a polycarbonate impregnated composite substrate of woven glass fiber (e.g., thermoplastic) has greater durability than traditional glass panels, the edges of the touchpad surface panel 320 and neighboring palm rest surface panels 302 and 303 may extend to the outer borders of the base chassis upper portion 310 (or to metallic vertical walls forming the outer borders of the base chassis as a tray for insertion of the palm rest surface panels 302 and 303 as an inlay, as described in greater detail below with respect to FIG. 4J) to provide a further seamless look and without encountering the durability concerns encountered when using a glass panel, as described above.

Embodiments of the present disclosure employ a three-panel haptic touchpad and palm rest base chassis assembly 300 providing an aesthetically pleasing and durable three-panel upper surface with exterior edges defining the outer boundary of the base chassis. In some embodiments, as described in greater detail below with respect to FIG. 4K, the outer boundaries of the base chassis upper surface may be defined by vertical walls of a metallic or other material, such as aluminum, as part of the base chassis upper portion 310 for example. These vertical walls may surround the front edge of the touchpad surface panel, the left palm rest surface panel front edge, the right palm rest surface panel front edge, the left edge of the left palm rest surface panel, and the right edge of the right palm rest surface panel, so as to form a tray for insertion of the left palm rest surface panel, the right palm rest surface panel, and the touchpad surface panel. The three panels may be comprised of the same polycarbonate impregnated composite substrate of woven glass fiber that provides a glass-like texture and may increase the surface area and "clickable" area of the touchpad in comparison to the dive-board design used in conventional chasses in some embodiments. The upper surface of the haptic touchpad assembly (e.g., surface panel 320 manipulated by the user) and both the right and left palm rest surface panels 302 and 303 neighboring the touchpad upper surface may form the three panels, which may also extend away from the user to form a portion of an opening 330 within the base chassis upper portion 310 for insertion of a keyboard. This design may provide a near-seamless, glass-like finish across the majority of the base chassis upper portion 310 (e.g., the touchpad and palm rest surfaces, 302, 303, and 320) that extends to the front, left, and right outer boundaries of the base chassis upper portion 310 and to the bottom edge of the keyboard opening 330. In alternative embodiments, the three panels may be comprised of different materials where the polycarbonate impregnated composite substrate of woven glass fiber provides a glass-like texture for the touchpad area and the palm rest areas may be comprised of polycarbonate or another material that need not be as rigid as the palm rest areas may be supported by the base chassis upper portion for rigidity.

A polycarbonate impregnated composite substrate of woven glass fiber in some embodiments may be used to form the touchpad surface panel 320, the left palm rest surface panel 302 and the right palm rest surface panel 303 in some embodiments. Such a substrate may have a thickness at the side walls (e.g., left, right, front and rear edges) of less than 5 millimeters (e.g., from 0.3 to 5 millimeters, alternatively from 2 to 5 millimeters, and alternatively of 1 millimeter) in various embodiments. This thickness of the polycarbonate impregnated composite substrate of woven glass fiber may provide sufficient cover stiffness in an embodiment for acceptable touchpad rigidity and mechanical operation of a haptic feedback or force sensing touchpad (e.g., without requiring an extra top surface or bottom surface for extra rigidity) compared to conventional touchpad and palm rest surface panels, and without bending or deformation occurring at the edges of the touchpad surface panel 320, left palm rest surface panel 302 or right palm rest surface panel 303. Thus, the top surface panel 320 of the haptic touchpad assembly in an embodiment may provide sufficient stiffness for operation of the haptic touchpad assembly and a durable, aesthetically pleasing glass-like finish.

The polycarbonate impregnated composite substrate of woven glass fiber forming the touchpad surface panel 320 in an embodiment may further be light transmissive in one or more areas, so as to allow the transmission of light from a light emitting diode (LED) situated beneath the touchpad surface panel 320 through one or more light-emitting icons 301 situated thereon. The light-emitting icons 301 in an embodiment may be etched into the impregnated polycarbonate material of the touchpad surface panel 320, so as to form a function row, for example. As described herein, the woven glass impregnated with polycarbonate material may also include additives in the polycarbonate such as titanium dioxide to provide additional spectral benefits such as uniform light diffusion in some embodiments. When present, each of the light emitting icons 301 may be illuminated from beneath the touchpad surface panel 320 (e.g., lit by one or more upward-facing light elements such as LEDs mounted within the haptic touchpad assembly, as described in greater detail below with respect to FIG. 5). Light emitted from such an LED in an embodiment may be visible to a user of the information handling system to indicate status or indicate touch-sensitive function buttons such as audio, volume, audio mute, microphone on/off, for example. In one embodiment, one or more sensors of a capacitive touch sensor or a portion of a capacitive touch sensor array may also be attached to the touchpad surface panel 320 in position beneath the individual icons 301 and designated to accept user touch input to control the respective functions of each icon, as described in greater detail below with respect to FIG. 5. This is in addition to sensors of such a capacitive touch sensor array capable of sensing location of user touch input provided to the touchpad surface panel 320 by fingers of a user, as described in greater detail above with respect to FIG. 2 and below with respect to FIG. 4A.

In other embodiments, the touchpad surface 320 may be disposed between two palm rests 302 and 303 of a differing material, for example comprising polycarbonate material, or other conventional plastic or metal. In still other embodiments, the touchpad surface 320 of the present embodiments allowing for a thin haptic touchpad stack and effective rigidity for haptic movement or force detection of the present embodiments may be inserted into a windowed island opening within the base chassis upper portion 310, which may be comprised of a polycarbonate material, or other conventional plastic or metal.

Figure 3B:
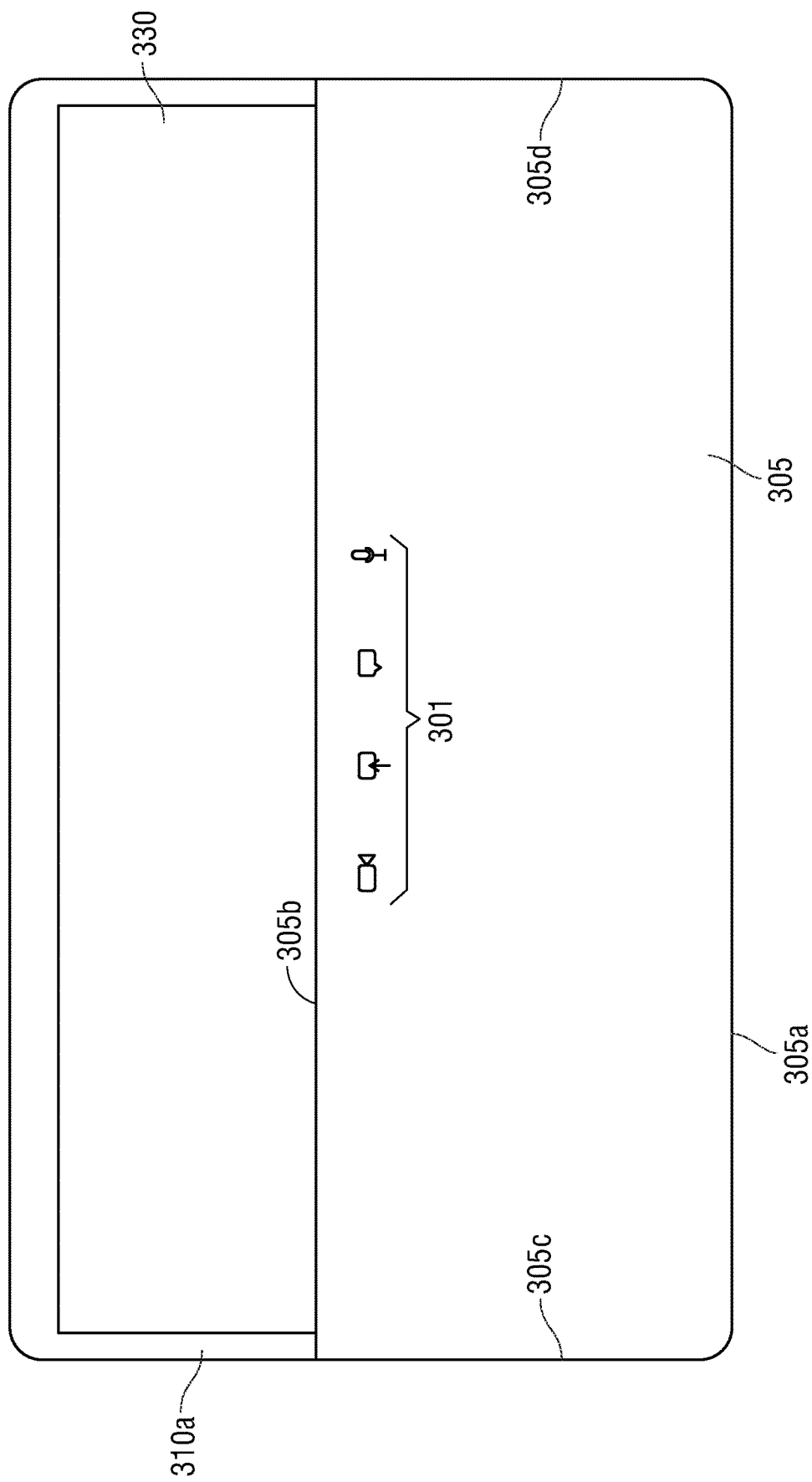
FIG. 3B is a graphical diagram illustrating a top view of a unitary substrate combining a touchpad and palm rest assembly according to an embodiment of the present disclosure.

FIG. 3B is a graphical diagram illustrating a top view of a base chassis for an information handling system including a unitary substrate combining a touchpad and palm rest assembly according to an embodiment of the present disclosure. As described herein, in some embodiments, a unitary substrate sheet 305 may form the upper surface of the haptics-enabled touchpad assembly and the palm rest surface panels. Similar to the three-panel design described above with respect to FIG. 3A, because such a polycarbonate impregnated composite substrate of woven glass fiber has greater durability than traditional glass panels, the edges of the unitary substrate sheet 305 comprising the touchpad and both palm rests may extend to the outer borders of the base chassis and the keyboard, such as in keyboard opening 330, without encountering the durability concerns encountered when using a glass panel, as described above. More specifically, the front edge of the unitary substrate 305 in an embodiment may extend to the front border of the upper portion of the base chassis 310*a*, and the rear edge of the unitary substrate 305 may extend to an opening 330 within the base chassis upper portion 310*a* for insertion of the keyboard. Additionally, the left side edge 305*c* of the unitary substrate may extend to the left border of the base chassis upper portion 310*a*, and the right side edge 305*d* of the unitary substrate may extend to the right border of the base chassis upper portion 310*a*. In some embodiments, the left side edge 305*c*, right side edge 305*d* and front edge 305*a* may have a band of material, such as aluminum, as part of the base chassis upper portion 310*a* to form a tray for the unitary substrate sheet 305 comprising a touchpad area and side palm rest areas. The single-panel design depicted at FIG. 3B may also include bottom-lit icons 301, as described above with respect to FIG. 3A, and described in greater detail below with respect to FIG. 5.

FIG. 4A is a graphical diagram illustrating a front cross-sectional view of a haptic touchpad assembly incorporating a piezo assembly for haptic user feedback according to an embodiment of the present disclosure. As described herein, sensors of a capacitive touch sensor array (e.g., as described in greater detail above with respect to FIG. 2) may be capable of sensing location of user touch input provided to a touchpad surface panel 451 of a haptic touchpad assembly 490. The haptic touchpad assembly 490 in an embodiment may include touchpad surface panel 451 that includes light transmissivity operatively connected to the touchpad surface panel 451 and the touchpad printed circuit board assembly (PCBA) 453. PCBA 453, in some embodiments, may include a capacitive touch sensing array on a top side, for example, to sense touch location by a user on top surface panel 451. Functionality and hardware components of the touchpad PCBA 453, including controllers for operation of one or more piezo actuators 426 within piezo-assembly in an embodiment are described in greater detail above with respect to FIG. 2. The piezo actuators 426 within piezo-assemblies in an embodiment may be disposed beneath and mechanically joined to the touchpad PCBA 453, for example. Piezo actuators 426 may detect force for a click function as well as provide haptic feedback according to embodiments herein. A touchpad support bracket 455 may be mechanically and operatively coupled to the piezo actuators 426 of the piezo assemblies, and to the touchpad PCBA 453 to form haptic touchpad assembly 490. As described in greater detail below with respect to FIGS. 4B-4K, the support bracket 455 may operate to fix the haptic touchpad assembly 490 in place with respect to a base chassis upper portion (not shown) for the information handling system, and to provide sufficient rigidity for the haptic touchpad assembly 490 to function properly. In one embodiment, the touchpad support bracket 455 may be mounted in a base chassis upper portion such as that may support palm rest panels (not shown) in either side of the touchpad surface panel 451, for example as with a three-panel haptic touchpad surface assembly. In another embodiment in which the touchpad surface panel 451, left palm rest surface panel and right palm rest surface panel are comprised of a unitary substrate (e.g., as described above with respect to FIG. 3B at 305), the touchpad surface panel 451 may extend to the right and left (not shown), beyond the right and left boundaries of the support bracket 455 and be supported by a base chassis upper portion.

As described in greater detail above with respect to FIG. 2, piezo actuators 426 within the piezo assembly may be situated along various points beneath the touchpad surface panel 451, and other layers in parts such as PCBA 453 with a capacitive touch sensor array. Thus, specific piezo actuators are meant to cause haptic feedback felt by specific portions of the user's hands that may touch the touchpad surface panel 451. In some embodiments as described, the piezo actuators may also detect force or pressure applied above the piezo actuator 426 such as a click action on the touchpad surface panel 451. For example, one of the piezo actuators 426 within the piezo assembly may be situated in the upper center portion of the touchpad surface panel 451 to provide haptic feedback to a user's index finger of either hand interfacing these. One or more piezo isolation spacers 454 may be situated directly beneath the piezo assemblies to provide clearance between the piezo actuator 426 and the touchpad support bracket 455 during deflection, and to provide electrical isolation between a brass conductive layer of the high voltage piezo and the metallic touchpad support bracket 455.

FIG. 4B is a graphical diagram illustrating a front cross-sectional view of a top-mounted haptic touchpad assembly 490 mechanically and operatively coupled to a base chassis upper portion 440 via top-mounted fasteners 461 according to an embodiment of the present disclosure. As described herein, the touchpad surface panel 451, left palm rest surface panel 402, and right palm rest surface panel 403 may be composed of a polycarbonate impregnated composite substrate of woven glass fiber (e.g., thermoplastic) that has greater durability than conventional base chasses for information handling systems such as laptop computers or tablet computers, for example. As such, the edges of the touchpad surface panel 451 and neighboring palm rests 402 and 403, respectively, or a unitary substrate (not shown) comprising the touchpad surface panel and the palm rest surfaces (e.g., as described above with respect to FIG. 3B at 305) may extend to the outer borders of the base chassis without encountering the durability concerns encountered when using a glass panel.

In an embodiment in which the touchpad surface panel 451 shown in FIG. 4B, left palm rest surface panel 402 and right palm rest surface panel 403 are comprised of a substrate (e.g., as described above with respect to FIG. 3A), the touchpad surface panel 451 may be matched to the level of the right palm rest surface panel 403 and left palm rest surface panel 402 of the shown image. The right palm rest surface panel 403 and left palm rest surface panel 402 may be situated directly above the adhesive layers 471 and 472. In other embodiments, the touchpad surface panel 451 may be a unitary sheet and extend to the right palm rest and left palm rest areas and take the place of the left palm rest surface panel 402 and right palm rest surface panel 403 shown in FIG. 4B. In various embodiments in which a unitary substrate forms the touchpad surface panel and palm rest surface panels, the haptic touchpad assembly may be bottom-mounted or top-mounted as shown. In a bottom-mounted example embodiment, the side screws 461 and 462 may be bottom-mounted such that they are rotated 180 degrees from the screws depicted in FIG. 4B.

In the shown embodiment of FIG. 4B using the three-panel design described above with respect to FIG. 3A, in order to ensure close alignment between the touchpad surface panel 451 and the palm rest surface panels 402 and 403, respectively (e.g., minimizing any gaps between these structures to provide a more seamless appearance) in an embodiment, the haptic touchpad assembly 490 (e.g., 390 from FIG. 3A, including the touchpad surface panel 451, touchpad PCBA 453, piezo assembly 426, piezo isolation spacers 454, and support bracket 454) may be mounted within an upper portion of the base chassis 440 from the top. For example, the support bracket 455 may be partially fixed in place with respect to the base chassis upper portion 440 on either side (e.g., right and left) of the support bracket 455 via top-mounted fasteners 462 in embodiments herein. In one example embodiment, the top-mounted side fasteners 461 and 462 may comprise screws operably connected to hardware (e.g., nut, threaded bushing, post) inserted into machined clearance openings formed within the base chassis upper portion 440 that includes the palm rest support sections 442 and 443 (e.g., as described in greater detail below with respect to FIGS. 4C and 4D). The base chassis upper portion 440 may further comprise a left palm rest support surface 442 and a right palm rest support surface 443 for mounting of the left palm rest surface panel 402 and the right palm rest surface panel 403, via adhesive layers 471 and 472, respectively, as described in greater detail below with respect to FIG. 4E.

As described in greater detail below with respect to FIGS. 4D through 4E, the haptic touchpad assembly 490 (e.g., 390 from FIG. 3A, including the touchpad surface panel 451, touchpad PCBA 453, piezo assembly 426, piezo isolation spacers 454, and support bracket 454) in an embodiment employing the three-panel design may be operatively coupled to the base chassis upper portion 440 prior to operatively connecting the palm rest surface panels 402 and 403 to the palm rest support surfaces 442 and 443. This may allow the manufacturer to adjust the location of the touchpad surface panel 451 or its height such that it is aligned with the edges of the palm rest surface panels 402 and 403 prior to finally fixing each of these structures (e.g., 490, 402 and 403) in place with respect to the base chassis upper portion 440 (e.g., as described in greater detail below with respect to FIG. 4F). For example, in some embodiments, a camera calibration method such as charge coupled device (CCD) camera alignment may be used to perform such alignments.

This may also allow the manufacturer to gauge any vertical displacement 473 between the touchpad surface panel 451 and the palm rest surface panels 402 and 403 and ensure lower tolerances between the same prior to finally fixing these structures in place in embodiments employing the three-panel design. The manufacturer may temporarily join the palm rest surface panels 402 and 403 to the base chassis upper portion 440 in an embodiment in order to gauge this distance. To increase aesthetics, such a vertical displacement 473 may be minimized as much as possible, giving the three-panel touchpad and palm rest base chassis assembly the appearance of a near-seamless, single sheet of glass. As described in greater detail below with respect to FIG. 4G, if the vertical displacement 473 is above a maximum tolerance (e.g., 0.25 mm), a shim may be placed between the support bracket 454 and palm rest support surfaces 442 and 443, respectively, to push the touchpad surface panel 451 upward and closer to the left and right palm rest surface panels 402 and 403.

FIG. 4C is a graphical diagram illustrating a perspective view of a top-mounted haptic touchpad assembly inserted within a base chassis upper portion according to an embodiment of the present disclosure. As described in an example herein, the haptic touchpad assembly 490 in an embodiment employing the three-panel design embodiment described above with respect to FIG. 3A may be inserted within a touchpad opening 444 of the base chassis upper portion 440. In an embodiment, the base chassis upper portion 440 may include a base chassis upper portion front boundary 440a, a base chassis upper portion left side boundary 440b, and a base chassis upper portion right side boundary 440c, a left palm rest support surface 442, and a right palm rest support surface 443. The haptic touchpad assembly 490 may include a touchpad surface panel 451 having a touchpad surface panel front edge 451a, a touchpad surface panel rear edge 451b, with the touchpad surface panel 451 operably connected to the support bracket 455 (e.g., with intervening layers such as touchpad PCBA with a capacitive touch array, piezo isolators, and piezo assemblies described in greater detail above with respect to FIG. 4A). The support bracket 455 in an embodiment may include a plurality of machined clearance openings 455e to either side of the touchpad surface panel 451 for receiving hardware (e.g., threaded bushing, nut, post) into which fasteners such as a screw may be inserted to operatively couple the support bracket 455 to the base chassis upper portion 440, the left palm rest support surface 442, or the right palm rest support surface 443, as described in greater detail above with respect to FIG. 4B, or below with respect to FIG. 4D.

FIG. 4D is a graphical diagram illustrating a top view of a top-mounted haptic touchpad assembly mechanically and operatively coupled to a base chassis upper portion via top-mounted fasteners for alignment with a front edge and a keyboard opening of the base chassis according to an embodiment of the present disclosure. As described herein, the haptic touchpad assembly 490 (e.g., including the touchpad surface panel 451 in an embodiment employing the three-panel design embodiment described above with respect to FIG. 3A may be operatively connected to support bracket 454) in an embodiment may be operatively coupled to the base chassis upper portion 440 prior to operatively connecting the palm rest surface panels to the left palm rest support surface 442 and right palm rest support surface 443, respectively. For example, the support bracket 455 in an embodiment may include a support bracket left side 455c operatively coupled to the base chassis upper portion 440 or the left palm rest support surface 442 via top-mounted left-side fasteners 461 (e.g., threaded screws) and a support bracket right side 455d operatively coupled to the base chassis upper portion 440 or the right palm rest support surface 443 via top-mounted right-side fasteners 462 (e.g., threaded screws). This support bracket left side 455c and support bracket right side 455d may be movable with plural alignment holes to allow the manufacturer to adjust the location of the touchpad surface panel 451 by moving the touchpad surface panel 451 forward, toward the base chassis upper portion front boundary (e.g., 440a of FIG. 4C), backward toward the base chassis upper portion rear edge (e.g., 451b of FIG. 4C), to the left toward the left palm rest support surface 442, of to the right toward the right palm rest support surface 443 prior to adding fasteners 461 and 462. The manufacturer may perform such positional adjustments to ensure the touchpad surface panel 451 is aligned with the edges of the palm rest surface panels while minimizing tolerance prior to finally fixing each of these structures in place with respect to the base chassis upper portion 440 (e.g., as described in greater detail below with respect to FIG. 4F). For example, in some embodiments, a camera calibration method such as charge coupled device (CCD) camera alignment may be used to perform such alignments.

FIG. 4E is a graphical diagram illustrating a perspective view of a touchpad and palm rest base chassis assembly incorporating palm rest surface panels in an information handling system base chassis 400 according to an embodiment of the present disclosure. As described herein, in an embodiment employing the three-panel design embodiment described above with respect to FIG. 3A, the support bracket 455 may be operatively coupled to the base chassis upper portion 400 such that the manufacturer may align the touchpad surface panel left edge 451c with the right edge of the left palm rest surface panel 402, and align the touchpad surface panel right edge 451d with the left edge of the right palm rest surface panel 403. The manufacturer may also adjust the location of the touchpad surface panel 451 and support bracket 455 to ensure the rear edge of the touchpad surface panel 451 (e.g., 451b of FIG. 4C) aligns with the front edge of the keyboard opening 441 within the base chassis upper portion 440, where the keyboard may be later inserted. For example, in some embodiments, a camera calibration method such as charge coupled device (CCD) camera alignment may be used to perform such alignments. Once the position of the touchpad surface panel 451 with respect to the base chassis upper portion 440 in an embodiment has been finalized and fixed in place via the top-mounted fasteners (e.g., 461 and 462 of FIGS. 4C and 4D), the left palm rest surface panel 402 may be operatively connected to the left palm rest support surface 442 of the base chassis upper portion 440, and the right palm rest surface panel 403 may be operatively connected to the right palm rest support surface 443 of the base chassis upper portion 440, to form the touchpad and palm rest base chassis assembly 490 in an information handling system base chassis 400. Such operative connection of the left palm rest support surface 442 and the right palm rest support surface 443 may be adhesively coupled in one example embodiment. In some embodiments, top mounted screws 461 and 462 may be used to operably couple the support bracket 455 to the base chassis upper portion 440 as well. In still other embodiments, fasteners such as adhesives or magnets are contemplated.

FIG. 4F is a graphical diagram illustrating a bottom view of a support bracket of a haptic touchpad assembly 490 mechanically and operatively coupled to a base chassis upper portion via bottom-mounted fasteners according to an embodiment of the present disclosure. Once the position of the touchpad surface panel with respect to the base chassis upper portion 440 has been finalized, as described in greater detail herein, the support bracket 455 of the haptic touchpad assembly 490 (e.g., including the touchpad PCBA 420 and piezo actuator assemblies 426) may be immovably and mechanically and operatively coupled so that it is mechanically fixed to the base chassis upper portion 440 to ensure that the touchpad surface panel remains aligned with the palm rest surface panels, the front boundary of the base chassis upper portion 440, and the front edge of the keyboard opening within the base chassis upper portion 440 in some embodiments. This may be performed for embodiments in which the touchpad surface and palm rest surfaces are comprised of a unitary substrate (e.g., as described above with respect to FIG. 3B), in embodiments employing the three-panel design (e.g., as described above with respect to FIG. 3A) following the top-mounting method described above with respect to FIGS. 4C-4E, or in embodiments in which the haptic touchpad assembly is inserted within a windowed island of polycarbonate material, as described with respect to FIG. 3A. For example, the support bracket 455 may be mounted and further fixed to the base chassis upper portion 440 via a series of bottom-mounted fasteners inserted within clearance openings 455f machined into the base chassis upper portion 440, into which hardware such as threaded nuts, posts, or bushings may be inserted, for operable connection to a bottom-mounted screw or fastener. In an embodiment employing the three-panel design described above with respect to FIG. 3A, this may occur following the insertion of the top-mounted side fasteners 461 and 462. In embodiments in which the touchpad surface and palm rest surfaces are comprised of a unitary substrate (e.g., as described above with respect to FIG. 3B), the top-mounted side fasteners 461 and 462 may be replaced by bottom-mounted side fasteners 461 and 462 or may be omitted. The fastener openings 455f may be situated along the portions of the base chassis upper portion 440 nearest the support bracket rear edge 455b and the support bracket front edge 455a in some embodiments. In other embodiments, the fastener openings 455f may be situated along either side (e.g., left or right) of the base chassis upper portion 440. These openings 455f may be threaded, to inhibit further movement of the support bracket 455 with respect to the base chassis upper portion 440 upon finalization of the location of the haptic touchpad assembly as described in greater detail herein.

As described herein, although the top surface of the haptic touchpad assembly may extend to the front edge of the base chassis upper portion 440 in an embodiment, underlying layers of the haptic touchpad assembly (e.g., situated behind the support bracket 455 and including piezo actuators 426 and touchpad PCBA 420) may be set back from the front edge of the base chassis upper portion 440 to provide an open area for insertion of a radiofrequency (RF) antenna. The portions of the haptic touchpad assembly situated in FIG. 4F behind the support bracket 455 and including the support bracket 455 may cause interference or inhibit transmission of RF signals, while the touchpad surface panel may be RF-transparent. Thus, the area where a portion of the touchpad surface panel or a unitary substrate comprising both the touchpad surface panel and palm rests surface panels extends beyond the support bracket 455 toward the front edge of the base chassis upper portion 440 may form one or more RF transparent zones 464.

FIG. 4G is a graphical diagram illustrating a front cross-sectional view of a haptic touchpad assembly 490 mechanically and operatively coupled to a base chassis upper portion using shims for vertical alignment with palm rest surface panels according to an embodiment of the present disclosure. As described herein, the haptic touchpad assembly 490 in an embodiment may be operatively coupled to the base chassis upper portion 440 in an embodiment employing the three-panel design (e.g., as described above with respect to FIG. 3A) to allow the manufacturer to adjust the location of the touchpad surface panel 451 such that it is aligned with the edges of the palm rest surface panels 402 and 403. This may also allow the manufacturer to gauge any horizontal position as well as vertical displacement 474 between the touchpad surface panel 451 and the palm rest surface panels 402 and 403 prior to finally fixing these structures in place. For example, in some embodiments, a camera calibration method such as charge coupled device (CCD) camera alignment may be used to perform such horizontal position alignments. To increase aesthetics, such a vertical displacement (e.g., 473 of FIG. 4B) may be minimized as much as possible in order to also minimize the vertical displacement 474 shown in FIG. 4G, giving the three-panel touchpad and palm rest base chassis assembly the appearance of a near-seamless single sheet of glass. If the vertical displacement (e.g., 473 of FIG. 4B) is above a maximum tolerance (e.g., 0.25 mm), a shim 458a and a shim 458b may be placed between the support bracket of the haptic touchpad assembly 490 and the base chassis upper portion 440, to push the touchpad surface panel 451 upward and closer to the left and right palm rest surface panels 402 and 403.

FIG. 4H is a graphical diagram illustrating a side cross-sectional view of a haptic touchpad assembly mechanically and operatively coupled to a base chassis upper portion 400 to create a radiofrequency (RF) transparent zone within the information handling system base chassis for transceiving of data via an antenna disposed within the information handling system base chassis according to an embodiment of the present disclosure. As described herein, because the polycarbonate impregnated composite substrate of woven glass fiber comprising the touchpad surface panel 451 has greater durability than traditional glass panels, the edges of the touchpad surface panel 451 may extend to the front edge or boundary of the base chassis upper portion 440, which may include vertical walls of a metallic or other material forming a tray for insertion of the touchpad surface panel 451 and palm rests (e.g., as inlays as described in greater detail with respect to FIG. 4J) without encountering the durability concerns encountered when using a glass panel. Moreover, the composite substrate of woven glass fiber may be radiofrequency transparent in portions.

Although the top surface panel 451 of the haptic touchpad assembly or the single substrate comprising the touchpad surface panel and palm rest surface panels (e.g., as described above with respect to FIG. 3B) may extend to the front edge of the base chassis upper portion 440 in an embodiment, underlying layers of the haptic touchpad assembly (e.g., touchpad printed circuit board assembly (PCBA) 453, and support bracket 455) may be set back from the front edge of the base chassis upper portion 440 to provide an open area for insertion of a radiofrequency (RF) antenna 463 within a RF transparent zone 464. The support bracket 455 or portions of touchpad PCBA 453 in an embodiment may cause interference or inhibit transmission of RF signals, while the touchpad surface panel 451 may be RF-transparent. Thus, the area where a portion of the touchpad surface panel 451 extends beyond the support bracket 455 and the touchpad PCBA 453 toward the front edge of the base chassis upper portion 440 may form one or more RF transparent zones 464 since the composite of woven glass impregnated with polycarbonate for the touchpad surface panel 451 may be radiofrequency transparent.

An RF antenna 463 in an embodiment may be mounted at least partially within or beneath this RF transparent zone 464, and may be enclosed within an RF-transparent base chassis lower portion 465 (e.g., comprising an RF-transparent plastic) in an embodiment. The base chassis lower portion 465 may further include a housing (not shown) that may be joined to the base chassis upper portion 440 to enclose the components of the information handling system described with respect to FIG. 1 above, including the hardware processor 101, the memory 102, storage devices 103, and 107, and network interface device 160. The antenna 463 in an embodiment shown in FIG. 4H may correspond to at least one antenna 163 described above with respect to FIG. 1. Many information handling systems employ a plurality of RF antennas for communication in more than one communication standard or frequency range (e.g., WWAN, WLAN, Bluetooth®, NFC). Placement of these antennas (e.g., including 463) without interference is a challenge. Thus, there is a need to distribute antennas (e.g., including 463) around the edges of the base chassis (e.g., 440) where possible. In conventional systems, RF antennas cannot be placed directly under the haptic touchpad assembly situated nearest the front edge of the base chassis (e.g., directly beneath the leading edge of 451) because some conventional touchpad material, such as metal, or the PCBA, mechanical switches or supporting structure may inhibit or interfere with transmission or reception of RF waves. Because the top surface 451 of the touchpad and palm rest assembly in embodiments of the present disclosure employ a polycarbonate impregnated composite substrate of woven glass fiber that is RF-transparent, antennas (e.g., 463) may now be placed on the front edge of the base chassis 440, located nearest the user, at one or more radiofrequency window locations (e.g., 464). This may result in decreased interference among multiple antennas and more available solutions for distribution of antennas within the chassis, or the ability to add an additional antenna not previously enclosed within the base chassis in conventional systems.

FIG. 4I is a graphical diagram illustrating a bottom view of an antenna mechanically and operatively coupled to a base chassis upper portion and disposed at least partially beneath a haptic touchpad assembly 490 according to an embodiment of the present disclosure. As described herein, the support bracket 455 for the haptic touchpad assembly 490 may be operably coupled so that it is mounted to the base chassis upper portion 440 via a series of bottom-mounted fasteners 483 (e.g., screws in some example embodiments). In other embodiments, top mounted screws 461 and 462 may be used to operably couple the support bracket 455 to the base chassis upper portion 440 as well. In still other embodiments, fasteners such as adhesives or magnets are contemplated. The RF antenna 463 may then be operably coupled to mounts adjacent to the support bracket 455 and extending at least partially beyond the support bracket 455 toward the front edge of the base chassis upper portion 440. For example, a portion of the RF antenna 463 may be situated beneath the RF-transparent zone (e.g., 464) described above with respect to FIG. 4H and FIG. 4F.

FIG. 4J is a graphical diagram illustrating a perspective view of a touchpad and palm rest assembly in an information handling system base chassis including insertion of a keyboard operably coupled to a touchpad printed circuit board (PCBA) according to an embodiment of the present disclosure. Keyboard 411 may be inserted within the keyboard opening 441 of the base chassis upper portion 440. As described herein, the manufacturer may adjust the position of the touchpad surface panel 451 in an embodiment employing the three-panel design (e.g., as described above with respect to FIG. 3A), due to the top-mounted method of operably coupling the haptic touchpad assembly to the base chassis upper portion 440 such that it is moveable before final mounting. As described in greater detail herein, the manufacturer may adjust the location of the touchpad surface panel 451 to ensure the rear edge of the touchpad surface panel 451 aligns with the front edge of the keyboard opening 441 relative to a user location and aligns with the rear edge 402b of the left palm rest surface panel 402 and the rear edge 403b of the right palm rest surface panel 403. The touchpad surface panel 451 may also be adjusted to ensure horizontal and vertical alignment of the touchpad surface panel 451 as well as front edge alignment with the left palm rest surface panel front edge 402a and the right palm rest surface panel front edge 403a. For example, in some embodiments, a camera calibration method such as charge coupled device (CCD) camera alignment may be used to perform such alignments.

Keyboard 411 in an embodiment may be operably coupled to the touchpad printed circuit board assembly (PCBA) of the haptic touchpad assembly (e.g., as described above with respect to FIG. 2). In some embodiments, the outer boundaries of the base chassis upper surface 440 may extend to vertical walls 499 of a metallic or other material, such as aluminum, for example. These vertical walls 499 may surround the front edge of the touchpad surface panel 451, the left palm rest surface panel front edge 402a, the right palm rest surface panel front edge 403a, the left edge of the left palm rest surface panel 402, and the right edge of the right palm rest surface panel 403, so as to form a tray for insertion of the left palm rest surface panel 402, the right palm rest surface panel 403, and the touchpad surface panel 451.

Figure 4K:
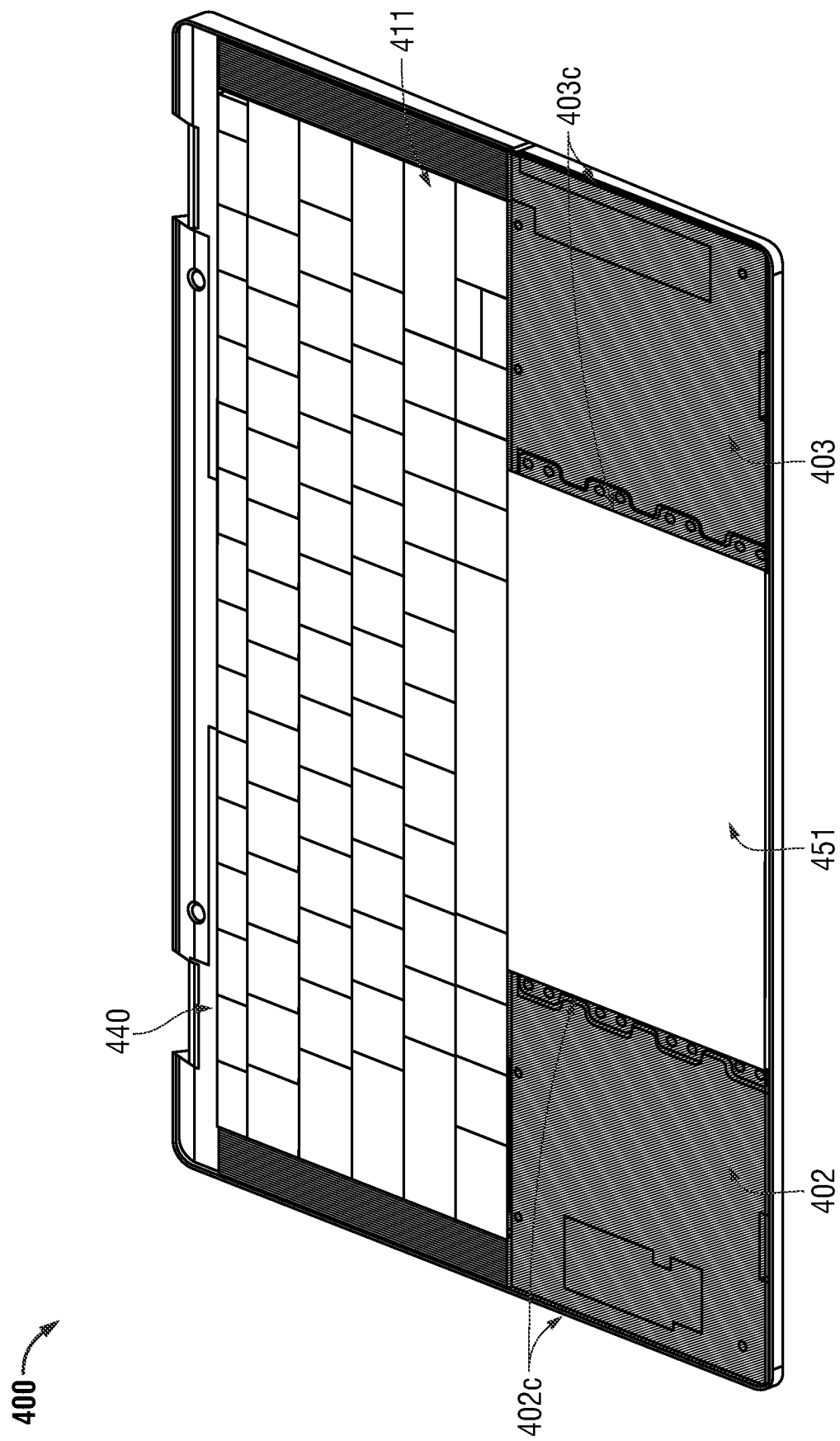
FIG. 4K is a graphical diagram illustrating a perspective view of palm rest surface panels and a touchpad surface panel aligned with a base chassis upper portion according to an embodiment of the present disclosure.

FIG. 4K is a graphical diagram illustrating a perspective view of a touchpad and palm rest assembly of an information handling system base chassis 400 incorporating palm rest surface panels and a touchpad surface panel aligned to form outer boundaries of the base chassis upper portion according to an embodiment of the present disclosure. As described herein, the manufacturer may adjust the position of the touchpad surface panel 451 in an embodiment employing the three-panel design (e.g., as described in an embodiment with respect to FIG. 3A), due to the top-mounted method of operably coupling the haptic touchpad assembly to the base chassis upper portion 440 such that it is moveable before final mounting. For example, the manufacturer may adjust the location of the touchpad surface panel 451 to ensure the left edge of the touchpad surface panel 451 aligns with the right side edge 402c of the left palm rest surface panel 402, and the right edge of the touchpad surface panel 451 aligns with the left side edge 403c of the right palm rest surface panel 403. For example, in some embodiments, a camera calibration method such as charge coupled device (CCD) camera alignment may be used to perform such alignments.

As also described herein, the three-panel haptic touchpad and palm rest assembly of the information handling system base chassis 400 in an embodiment or the unitary substrate comprising the touchpad surface panel and both palm rest surfaces in another embodiment may provide an aesthetically pleasing and durable upper touchpad and palm rest surface with exterior edges extending to the outer boundary of the base chassis upper portion 440. The three panels in a first embodiment (e.g., as described above with respect to FIG. 3A) or the unitary substrate in a second embodiment (e.g., as described above with respect to FIG. 3B) may be comprised of the same polycarbonate impregnated composite substrate of woven glass fiber that provides a near-seamless, glass-like texture and may increase the surface area and "clickable" area of the touchpad in comparison to the dive-board design used in some conventional solutions. The touchpad surface panel 451 and both the right and left palm rest surface panels 402 and 403 neighboring the touchpad surface panel 451 in such a first embodiment may form the three near-seamless panels, which may also extend away from the user toward the keyboard 411. The touchpad surface panel 451 and both the right and left palm rest surface panels 402 and 403 neighboring the touchpad surface panel 451 in such a second embodiment may be replaced by a unitary substrate (e.g., as described at 305 in FIG. 3B), which may also extend away from the user toward the keyboard 411. Because a polycarbonate impregnated composite substrate of woven glass fiber has greater durability than traditional glass panels, the edges of the touchpad surface panel 451 and neighboring palm rests 402 and 403, or the unitary substrate comprising all three of these structures into a single sheet (e.g., as described at 305 of FIG. 3) may extend to the outer borders of the base chassis upper portion 440 without encountering the durability concerns encountered when using a glass panel. Further, the left and right palm rest surface panels 402 and 403 in an embodiment may be fixed to the base chassis upper portion 440 so as to conceal the top-mounted side screws used to fix the touchpad surface panel 451 to the base chassis upper portion 440 in an embodiment employing the three-panel design (e.g., as described above with respect to FIG. 3A). In an embodiment in which a unitary substrate comprises the touchpad surface panel and both palm rests (e.g., as described above with respect to FIG. 3B), the portions of such a substrate extending above the palm rest support surfaces of the upper portion of the base chassis (e.g., in the location of the left and right palm rest surface panels 402 and 403 depicted in FIG. 4K) may be fixed to the base chassis upper portion 440 of the information handling system base chassis 400. This design may provide a glass-like finish across the majority of the base chassis upper portion (e.g., the touchpad and palm rest surfaces) that extends to the front, left, and right outer boundaries of the base chassis upper portion and to the bottom edge of the keyboard. It further provides one or more RF-transparent zones to increase available locations for RF antennas on the information handling system base chassis 400.

Figure 5:
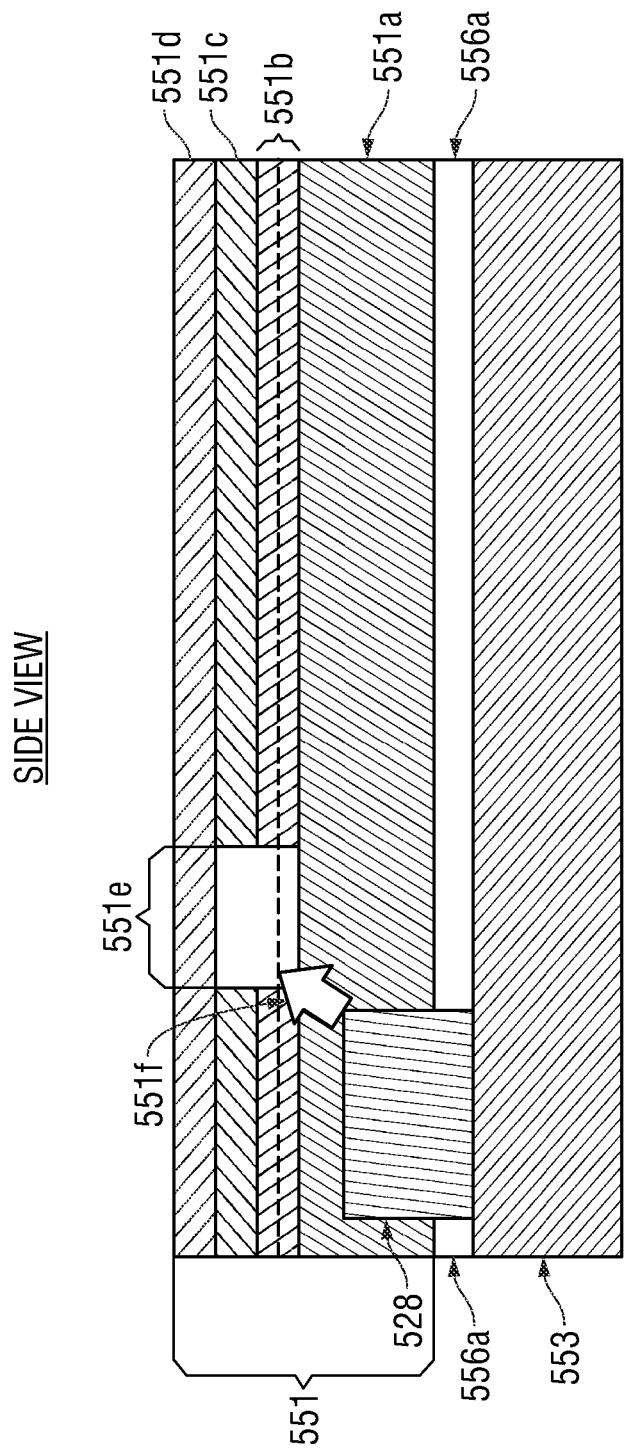
FIG. 5 is a graphical diagram illustrating a side cross-sectional view of a composite substrate of woven glass fiber impregnated with polycarbonate material and a light emitting diode (LED) light source according to an embodiment of the present disclosure.

FIG. 5 is a graphical diagram illustrating a side cross-sectional view of a composite substrate of woven glass fiber impregnated with polycarbonate material with an etched tough or opening for insertion of a light emitting diode (LED) according to an embodiment of the present disclosure. A sheet-like part of woven glass fiber material may be impregnated with polycarbonate material to form a laminate sheet of the composite substrate of woven glass fiber impregnated with polycarbonate material 551a in an embodiment. The composite substrate of woven glass fiber impregnated with polycarbonate material may be light transmissive in an embodiment and may eliminate the need for an extra light guide layer. The woven glass impregnated with polycarbonate material 551a may also include additives in the polycarbonate such as titanium dioxide to provide additional spectral benefits such as uniform light diffusion in some embodiments. The composite substrate of woven glass fiber impregnated with polycarbonate material 551a in an embodiment may include from 3 to 5 layers of woven glass fiber material present in an amount from 40% to 70% by volume fiber content, alternatively 32% by volume fiber content. In other embodiments, the woven glass fiber material may be present in an amount less than 40% by volume fiber content or greater than 70% by volume fiber content. Any suitable type of woven glass fiber may be employed (e.g., such as plain weave or twill).

In one example embodiment, the composite substrate of woven glass fiber impregnated with polycarbonate material 551*a* may be impregnated with 30% to 60% by volume polycarbonate polymer which may include recycled polycarbonate polymer. In an embodiment, the composite substrate of woven glass fiber impregnated with polycarbonate material 551*a* may have a stiffness provided by a flexural modulus of from 10 to 25 gigapascals (GPa), for example. It will be understood that the above characteristics of the composite substrate of woven glass fiber impregnated with polycarbonate material 551*a* are exemplary only, and that in other embodiments, the amount of woven glass fiber material in the composite may be more or less than 32% by volume, and the amount of polycarbonate polymer may be more than 60% or less than 30% by volume. Moreover, the stiffness or flexural modulus of substrate of woven glass fiber impregnated with polycarbonate material 551*a* may be less than 10 GPa or greater than 25 GPa. Examples of suitable impregnated woven glass fiber composite materials may include, for example, an impregnated thermoplastic woven glass fiber composite material that includes multiple layers of woven glass fiber material and that is available as a GF9xIP from InnoPeak Advanced Materials of Taichung, Taiwan.

The composite substrate of woven glass fiber impregnated with polycarbonate material 551*a* in an embodiment may be screen printed (e.g., such as with different color layers of ink 551*b* or other printed material, or printed effects such as mica, sparkle, etc.,) to form lettering, number, or other indicia such as described in relation to FIG. 3A or FIG. 3B at 301. A UV molding process may be employed in an embodiment to create UV molding features 551*c* (e.g., using polyurethan acrylate) that may include multiple different finishes or textures. In some embodiments, the composite substrate of woven glass fiber impregnated with polycarbonate material 551*a* may be sprayed with an anti-smudge coating 551*d*, such as PPG EC1103-D™ available from PPG Industries, Inc.® of Pittsburgh, Pennsylvania.

As described herein, the polycarbonate impregnated composite substrate of woven glass fiber (e.g., thermoplastic) 551*a* forming the touchpad surface panel 551 and palm rest surface panels in various embodiments described herein may also be light diffusing, thus negating the need for a separate lightguide layer within the touchpad and palm rest assembly. Many touchpad and even some palm rest assemblies may incorporate backlit icons (e.g., such as described in FIGS. 3A and 3B at 301) on the surface panels that users may select to perform various discrete tasks, such as altering volume, or muting the microphone or speakers of the information handling system, for example. In order to provide such icon backlighting in existing systems employing either glass or polycarbonate materials described herein with windowed designs, a lightguide layer may be employed to guide light from a light emitting diode (LED) situated between the printed circuit board assembly (PCBA) of the haptic touchpad assembly and the touchpad surface panel.

In embodiments of the present disclosure that employ the polycarbonate impregnated composite substrate of woven glass fiber 551*a*, such a separate light guide layer may not be necessary, as the substrate 551*a* itself is light transmissive and may be light diffusing. An opening or trough at the location of shown LED 528 may be etched within the substrate 551*a* in an embodiment, for insertion of the LED 528 in the polycarbonate impregnated composite substrate of woven glass fiber 551*a*. Light may transmit or diffuse beneath an icon opening 551*c* etched in the inked layer 551*b* or UV molding features 551*c* of the surface panel 551. The light diffusing nature of the polycarbonate impregnated composite substrate of woven glass fiber 551*a* may operate to direct light emitted from the LED 528 through the icon opening 551*e* in an embodiment. The LED 528 may be operatively connected to the touchpad printed circuit board assembly (PCBA) 553, which may be fixed to the surface panel 551 via an adhesive layer 556*a*. By removing the separate lightguide layer within the haptic touchpad assembly in such embodiments, the total thickness (e.g., in the z-direction) of the haptic touchpad assembly may be decreased, saving space within the chassis. In one embodiment, a capacitive touch sensitive sensor array (not shown) may be operatively coupled to an underside of the touchpad surface panel 551. In other embodiments, the capacitive touch sensor array may be on a top surface of the PCBA 553.

Figure 6:
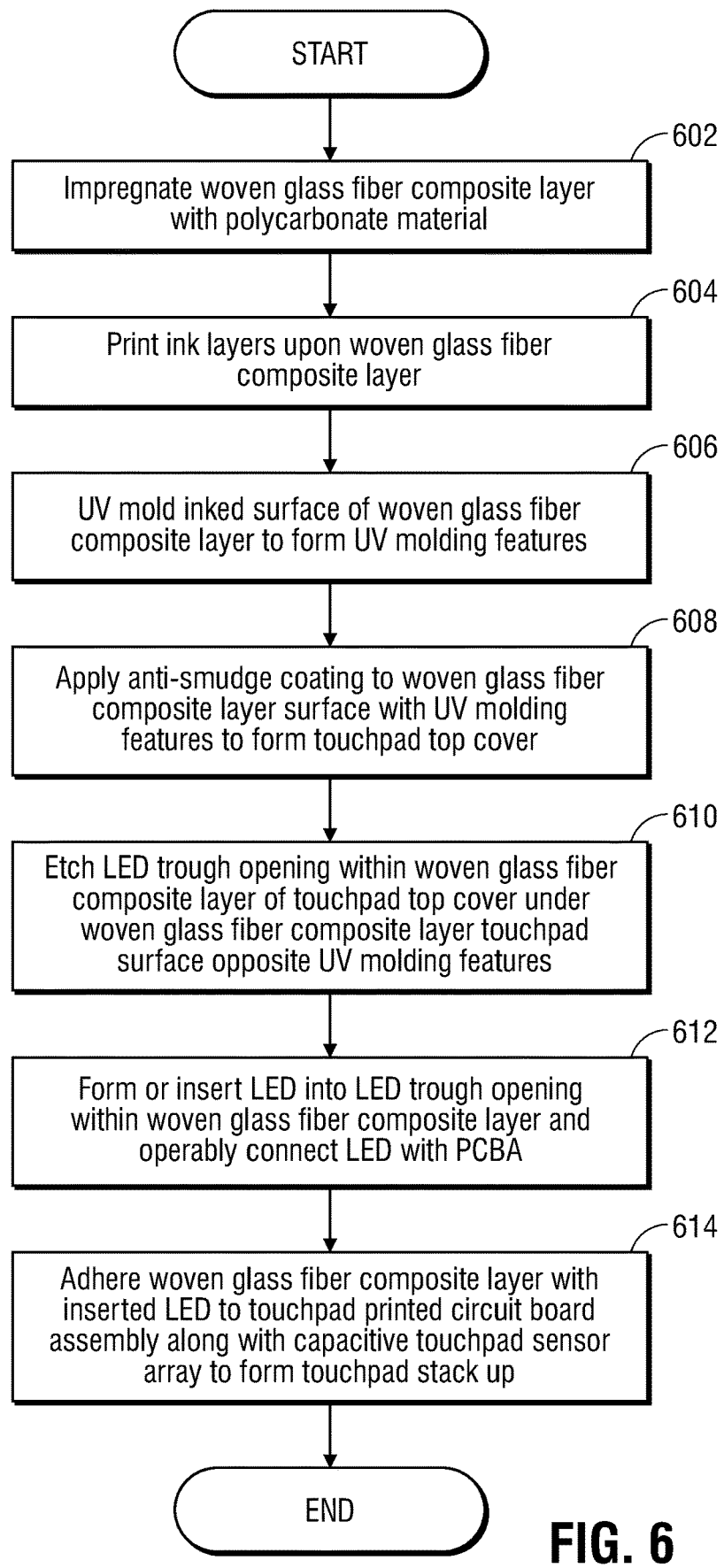
FIG. 6 is a flow diagram illustrating a method of forming or operatively connecting a touchpad PCBA to a light emitting diode (LED) disposed within an etched opening of a touchpad surface panel according to an embodiment of the present disclosure.

FIG. 6 is a flow diagram illustrating a method of operatively connecting a touchpad printed circuit board assembly (PCBA) to a light emitting diode (LED) disposed within an etched opening of a composite substrate of woven glass fiber impregnated with polycarbonate material to form a touchpad surface panel according to an embodiment of the present disclosure. As described herein, the use of composite substrate of woven glass fibers (e.g., thermoplastics) impregnated with polycarbonate material as the base chassis upper portion or the upper surface of the touchpad in an embodiment may address the durability and aesthetics issues presented by these conventional designs. Such polycarbonate impregnated composite substrate of woven glass fibers in an embodiment may also enable light diffusion throughout its thickness, allowing for emission of light through the touchpad surface panel to illuminate one or more touch icons.

At block 602, a woven glass fiber layer may be impregnated with a polycarbonate material in an embodiment to form a unitary sheet, a touchpad surface layer panel, or even palm rest surface panels. For example, in an embodiment described with respect to FIG. 5, a sheet-like part of woven glass fiber material may be impregnated with polycarbonate material to form a laminate sheet of the composite substrate of woven glass fiber impregnated with polycarbonate material 551 in an embodiment. The composite substrate of woven glass fiber impregnated with polycarbonate material 551 in an embodiment may be impregnated with 30% to 60% by volume polycarbonate polymer which may include recycled polycarbonate polymer in one example embodiment. In one embodiment, the composite substrate of woven glass fiber impregnated with polycarbonate material 551 may have a stiffness provided by a flexural modulus of from 10 to 25 gigapascals (GPa), for example.

An ink layer may be printed upon the composite substrate of woven glass fiber impregnated with polycarbonate material in an embodiment at block 604. For example, the composite substrate of woven glass fiber impregnated with polycarbonate material 551 in an embodiment may be screen printed (e.g., such as with different color layers of ink or other printed material, or printed effects such as mica, sparkle, etc.,) to form lettering, number, or other indicia as light openings in the composite substrate of woven glass fiber impregnated with polycarbonate material 551. More specifically, as described in an embodiment with respect to FIGS. 3A and 3B, such an ink layer may be used to screen print leaving light transmissive portions that form the light-emitting icons 301. In other embodiments, icon may be printed as positive or negative space icons or both on the composite substrate of woven glass fiber impregnated with polycarbonate material 551.

At block 606 in an embodiment, the inked surface of the composite substrate of woven glass fiber impregnated with polycarbonate material may be UV molded to form UV molding features. For example, in an embodiment described with respect to FIG. 5, a UV molding process may be employed in an embodiment to create UV molding features (e.g., using polyurethan acrylate) that may include multiple different finishes or textures.

The UV-molded inked surface of the composite substrate of woven glass fiber impregnated with polycarbonate material in an embodiment may also by sprayed with an anti-smudge coating at block 608. For example, in some embodiments, the composite substrate of woven glass fiber impregnated with polycarbonate material 551 may be sprayed with an anti-smudge coating, such as PPG EC1103-D™ available from PPG Industries, Inc.® of Pittsburgh, Pennsylvania.

At block 610, a light emitting diode (LED) opening or trough may be etched within the composite substrate of woven glass fiber impregnated with polycarbonate material. For example, in an embodiment described with respect to FIG. 5, an opening may be etched within the composite substrate 551a of woven glass fiber impregnated with polycarbonate material for insertion of the LED 528 between the inked layer 551b and the touchpad printed circuit board assembly (PCBA) 553. Such an opening in various embodiments may be etched using chemical etching, acid deposition, or machining, for example.

One or more LEDs may be inserted within one or more LED openings or troughs etched within the composite substrate of woven glass fiber impregnated with polycarbonate material and operably coupled to the touchpad PCBA in an embodiment at block 612. For example, one or more light emitting diodes (LEDs) 528 may be formed on the PCBA and situated within one or more openings or troughs of the substrate 551a of woven glass fiber impregnated with polycarbonate material, between the remaining layers of the touchpad surface panel 551 and the touchpad PCBA 553. An LED controller or other controller on the PCBA may control operation of the LEDs 528 (e.g., as described in greater detail above with respect to FIG. 2).

At block 614 in an embodiment, the substrate 551a of woven glass fiber impregnated with polycarbonate material in an embodiment may be adhered the touchpad PCBA 553 to form the touchpad stack. For example, the substrate 551a of woven glass fiber impregnated with polycarbonate material in an embodiment may be operably connected to the touchpad PCBA 553 via an adhesive layer 556a, so as to position one or more light emitting diodes (LEDs) 528 between the inked layer 551b of the touchpad surface panel 551 and the touchpad PCBA 553. In one example embodiment, an adhesive layer 556a may be used to operably connect the touchpad PCBA 553 to the composite substrate of woven glass fiber impregnated with polycarbonate material 551a. The substrate 551a of woven glass fiber impregnated with polycarbonate material in an embodiment may direct light emitted from the LED 528 toward one or more inked icon openings 551e within the touchpad surface panel 551 such that the icons are light-illuminated for touch-selection by the user via the touchpad surface panel 551. Thus, the light-diffusing nature of the substrate 551a of woven glass fiber impregnated with polycarbonate material in an embodiment may negate the need for a separate light-guide layer disposed between the PCBA 553 and the touchpad surface panel 551. In one embodiment, a capacitive touch sensitive sensor array may be operatively coupled to an underside of the touchpad surface panel 551. In other embodiments, the capacitive touch sensor array may be on a top surface of the PCBA 553. The method of operatively connecting a touchpad printed circuit board assembly PCBA to an LED disposed within an etched opening of a substrate of woven glass fiber impregnated with polycarbonate material to form a touchpad surface panel may then end.

Figure 7:
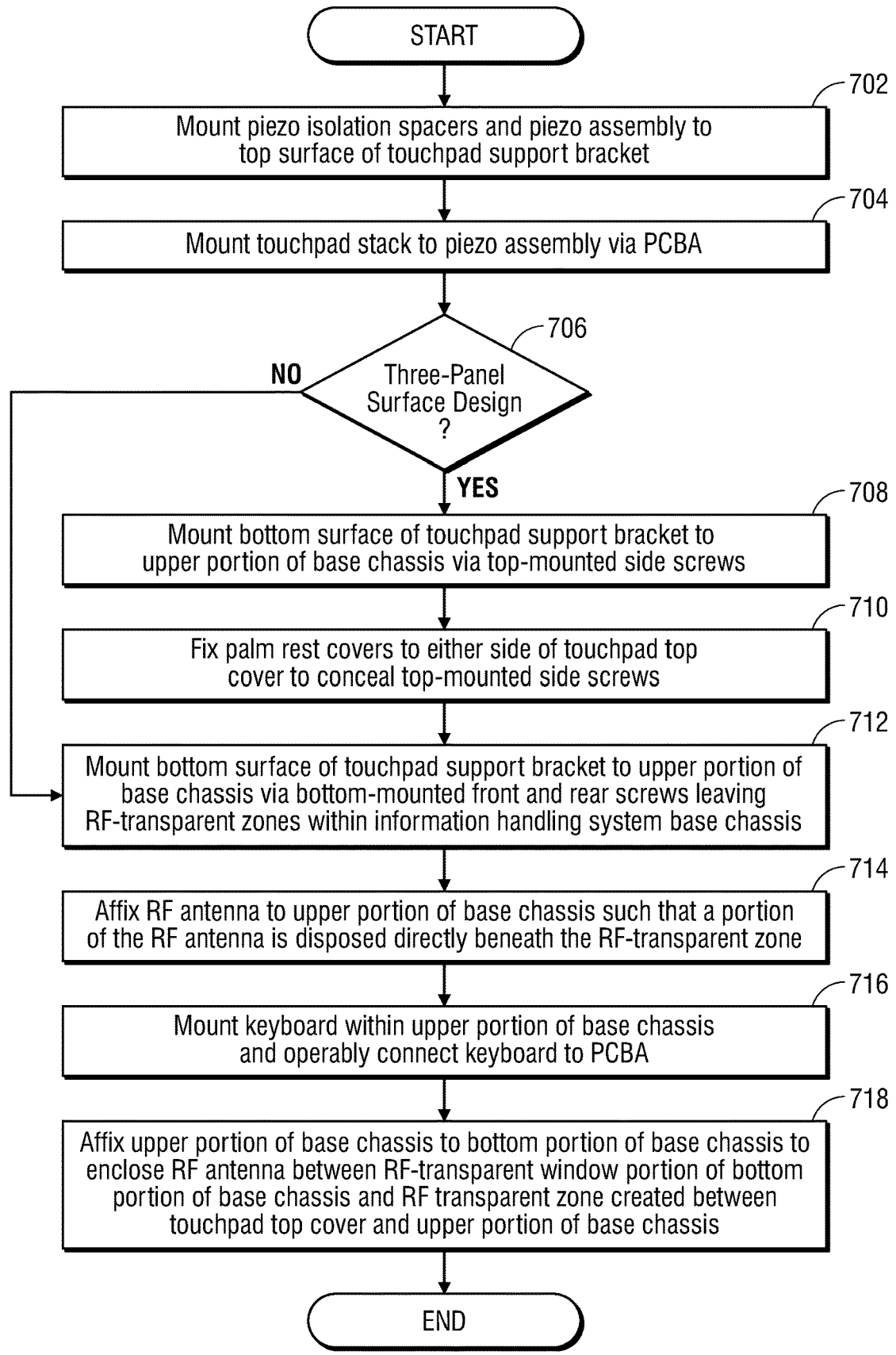
FIG. 7 is a flow diagram illustrating a method of mounting a haptic touchpad assembly to a base chassis upper portion to form a touchpad and palm rest base chassis assembly according to an embodiment of the present disclosure.

FIG. 7 is a flow diagram illustrating a method of mounting a haptic touchpad assembly with a composite substrate of woven glass fiber impregnated with polycarbonate material touchpad surface panel to a base chassis upper portion to form a touchpad and palm rest assembly of an information handling system base chassis according to an embodiment of the present disclosure. As described herein, the haptic touchpad and palm rest assembly in various embodiments may provide an aesthetically pleasing and durable three-panel, windowed, or unitary upper surface with exterior edges extending to the outer boundary of the information handling system base chassis upper portion which may include metallic vertical walls or another material forming the exterior edges. The three panels or unitary substrate may be comprised of the same polycarbonate impregnated composite substrate of woven glass fiber that provides a glass-like texture that is light transmissive and may provide a dual use lightguide layer for illuminating the touchpad, sufficient stiffness to support a haptics-driven touchpad assembly, a lower risk of chipping and cracking than glass, and a radiofrequency transparent layer to allow for an antenna window under the touchpad surface.

At block 702, piezo isolation spacers and a piezo assembly may be mounted to a touchpad support bracket. For example, in an embodiment described with respect to FIG. 4A, touchpad support bracket 455 may be operatively connected to the piezo assemblies 426. One or more piezo isolation spacers 454 may be situated directly beneath the piezo assemblies 426, and to provide electrical isolation between a brass conductive layer of the high voltage piezo and the metallic touchpad support bracket 455.

The touchpad stack including the touchpad surface panel in an embodiment may be operably coupled to the piezo assembly via the touchpad printed circuit board assembly (PCBA) at block 704. For example, the piezo assemblies 426 may be situated along various points beneath the touchpad surface panel 451 such that specific piezo actuators are meant to cause haptic feedback felt by specific portions of the user's hands via the touchpad surface panel and in some embodiments palm rest side panels. The piezo-assemblies 426 in an embodiment may be disposed beneath and operably coupled to the touchpad PCBA 453, for example.

A manufacturer may determine at block 706 in an embodiment whether to employ the three-panel design described herein, or the unitary substrate design or a windowed design. As described herein, the touchpad surface panel and both the right and left palm rest surface panels neighboring the touchpad surface panel may form the three panels in a three-panel design in a first embodiment (e.g., as described above with respect to FIG. 3A). In a second embodiment, a unitary substrate may comprise the touchpad surface panel and both palm rest surface panels (e.g., as described above with respect to FIG. 3B) or a windowed haptic touchpad surface panel may be installed in an base chassis. In an embodiment in which the manufacturer chooses to employ the three-panel design, the method may proceed to block 708 for top-mounting of the touchpad and palm rest assembly within the upper portion of the base chassis. If the manufacturer chooses to employ the unitary substrate design, the method may proceed to block 712 for bottom-mounting of the touchpad and palm rest assembly. Similarly, for a window mounted haptic touchpad, the method may proceed to block 712 as well.

At block 708, in an embodiment in which the manufacturer has chosen to use the three-panel design (e.g., as described above with respect to FIG. 3A), flanges of the bottom surface of the touchpad support bracket may be mounted to an upper portion of the base chassis upper portion via top-mounted side screws to allow for adjustment of the position of the haptic touchpad assembly with respect to the base chassis upper portion, the palm rests, and a keyboard in some embodiments. For example, in an embodiment described with respect to FIG. 4B, in order to ensure close alignment (e.g., left-to-right and front-to-back) between the touchpad surface panel 451 and the palm rest surface panels 402 and 403, respectively (e.g., minimizing any gaps between these structures to provide a more seamless appearance), the haptic touchpad assembly may be mounted within an upper portion of the base chassis 440 from the top, rather than the bottom-mounted touchpad approach used in conventional systems. This may allow the manufacturer to adjust the location of the touchpad surface panel 451 such that it is aligned with the edges of the palm rest surface panels 402 and 403 and any keyboard prior to finally fixing each of these structures (e.g., 455, 402 and 403) in place with respect to the base chassis upper portion 440. For example, in some embodiments, a camera calibration method such as charge coupled device (CCD) camera alignment may be used to perform such alignments.

In another example embodiment described with respect to FIG. 4C, the support bracket 455 in an embodiment may include a plurality of machined clearance openings 455e or machined screw openings to either side of the touchpad surface panel 451 for operatively coupling the support bracket 455 to the base chassis upper portion 440, the left palm rest support surface 442, or the right palm rest support surface 443 via top-mounted side fasteners. For example, in another example embodiment described with respect to FIG. 4D, the support bracket 455 in an embodiment may include a support bracket left side 455c operatively coupled to the base chassis upper portion 440 or the left palm rest support surface 442 via top-mounted left-side fasteners 461 and a support bracket right side 455d operatively coupled to the base chassis upper portion 440 or the right palm rest support surface 443 via top-mounted right-side fasteners 462. This may allow the manufacturer to adjust the location of the touchpad surface panel 451 by moving the touchpad surface panel 451 forward, toward the base chassis upper portion front boundary (e.g., 440a of FIG. 4C), backward toward the base chassis upper portion rear edge (e.g., 451b of FIG. 4C), to the left toward the left palm rest support surface 442, or to the right toward the right palm rest support surface 443. In yet another example embodiment described with respect to FIG. 4E, the support bracket 455 may be operatively coupled to the base chassis upper portion such that the manufacturer may align the touchpad surface panel left edge 451c with the right edge of the left palm rest surface panel 402, and align the touchpad surface panel right edge 451d with the left edge of the right palm rest surface panel 403. The manufacturer may also adjust the location of the touchpad surface panel and support bracket 455 to ensure the rear edge of the touchpad surface panel (e.g., 451b of FIG. 4C) aligns with the front edge of the keyboard opening 441 within the base chassis upper portion 440, where the keyboard may be later inserted. For example, in some embodiments, a camera calibration method such as charge coupled device (CCD) camera alignment may be used to perform such alignments.

The manufacturer may determine in an embodiment whether the vertical displacement between the top surface of the touchpad surface panel and the right and left palm rest surface panels meets tolerances. For example, in an embodiment described with respect to FIGS. 4C, the top-mounting approach described herein may also allow the manufacturer to gauge any vertical displacement 473 between the touchpad surface panel 451 and the palm rest surface panels 402 and 403 prior to finally fixing these structures in place. The manufacturer may temporarily attach the palm rest surface panels 402 and 403 to the base chassis upper portion 440 in an embodiment to gauge this distance. To increase aesthetics, such a vertical displacement 473 may be minimized as much as possible (e.g., below a preset tolerance of 0.25 mm), giving the three-panel touchpad and palm rest base chassis assembly the appearance of a near-seamless single sheet of glass.

In an embodiment in which the vertical displacement between the top surface of the touchpad surface panel and the palm rest surface panels exceeds tolerances, vertical alignment shims may be inserted between the support bracket of the haptic touchpad assembly and the base chassis upper portion. For example, as described in an example embodiment with respect to FIG. 4G, if the vertical displacement 473 is above a maximum tolerance (e.g., 0.25 mm), a shim may be placed between the support bracket of the haptic touchpad assembly 490 and the base chassis upper portion 440 and palm rest support surfaces 443 and 443, respectively, to push the touchpad surface panel 451 upward and closer to the left and right palm rest surface panels 402 and 403. The method may then proceed to block 710 for fixing of the palm rest surface panels to the base chassis upper portion so as to conceal the top-mounted side screws.

The palm rest surface panels in an embodiment in which the manufacturer has chosen to employ the three-panel design (e.g., as described above with respect to FIG. 3A) may be fixed to the base chassis upper portion at block 710. For example, in an embodiment described with respect to FIG. 4E, once the position of the touchpad surface panel 451 with respect to the base chassis upper portion 440 in an embodiment has been finalized, the left palm rest surface panel 402 may be operatively connected to the left palm rest support surface 442 of the base chassis upper portion 440, and the right palm rest surface panel 403 may be operatively connected to the right palm rest support surface 443 of the base chassis upper portion 440, to form the touchpad and palm rest base chassis assembly 400. In another embodiment described with respect to FIG. 4J, for example, the left and right palm rest surface panels 402 and 403 in an embodiment may be fixed to the base chassis upper portion 440 so as to conceal the top-mounted side screws used to fix the touchpad surface panel 451 to the base chassis upper portion 440. This design may provide a glass-like finish across the majority of the base chassis upper portion (e.g., the touchpad and palm rest surfaces) that extends to the front, left, and right outer boundaries of the base chassis upper portion and to the bottom edge of the keyboard. In an example embodiment described with respect to FIG. 4J, vertical walls 499 may surround the front edge of the touchpad surface panel 451, the left palm rest surface panel front edge 402a, the right palm rest surface panel front edge 403a, the left edge of the left palm rest surface panel 402, the right edge of the right palm rest surface panel 403, so as to form a tray for insertion of the left palm rest surface panel 402, the right palm rest surface panel 403, and the touchpad surface panel 451. The method may then proceed to block 712 for addition of bottom-mounted screws to fix the support bracket to the upper portion of the base chassis.

At block 712, in both an embodiment employing the three-panel design (e.g., as described above with respect to FIG. 3A) and in an embodiment employing the unitary substrate design (e.g., as described above with respect to FIG. 3B) or even a window mounted design the bottom surface of the touchpad support bracket may be further mounted to the upper portion of the base chassis via bottom-mounted front and rear screws. This may leave an RF-transparent zone within the base chassis in some embodiments. For example, in an embodiment described with respect to FIG. 4F, once the position of the touchpad surface panel with respect to the base chassis upper portion 440 has been finalized, the support bracket 455 of the haptic touchpad assembly (e.g., including the touchpad PCBA 420 and piezo actuator assemblies 426) may be operatively coupled such that they are mechanically fixed to the base chassis upper portion 440. This ensures that the touchpad surface panel remains aligned with the palm rest surface panels, the front boundary of the base chassis upper portion 440, and the front edge of the keyboard opening within the base chassis upper portion 440. The support bracket 455 may be operatively coupled to the base chassis upper portion 440 via a series of bottom-mounted fasteners inserted within threaded fastener openings 455f operably connected to the base chassis upper portion 440. In an embodiment that employs the three-panel design (e.g., as described with respect to FIG. 3A), this may occur following the insertion of the top-mounted side fasteners 461 and 462. In another embodiment employing the unitary substrate (e.g., as described with respect to FIG. 3B), the side fasteners 461 and 462 may be bottom-mounted or may be omitted. The fastener openings 455f may be situated along the portions of the base chassis upper portion 440 nearest the support bracket rear edge 455b and the support bracket front edge 455a. These openings 455f may be threaded, to inhibit further movement of the support bracket 455 with respect to the base chassis upper portion 440 upon finalization of the location of the haptic touchpad assembly as described in greater detail herein.

As described herein, because the polycarbonate impregnated composite substrate of woven glass fiber comprising the touchpad surface panel 451, or comprising the touchpad surface panel and both palm rest surface panels has greater durability than traditional glass panels, the edges of the touchpad surface panel 451 or unitary substrate (e.g., 305 described above with respect to FIG. 3B) may extend to the front edge or boundary of the base chassis upper portion 440 and may include a metallic vertical wall or other vertical wall forming the front edge of the base chassis upper portion 440 without encountering the durability concerns encountered when using a glass panel. For example, in an embodiment described with reference to FIG. 4H, although the top surface panel 451 of the haptic touchpad assembly may extend to the front edge of the base chassis upper portion 440 in an embodiment, underlying layers of the haptic touchpad assembly (e.g., touchpad printed circuit board assembly (PCBA) 453, and support bracket 455) may be set back from the front edge of the base chassis upper portion 440 to provide an open area with an RF transparent window for insertion of a radiofrequency (RF) antenna. The support bracket 455 or touchpad PCBA 453 in an embodiment may cause interference or inhibit transmission of RF signals, while the touchpad surface panel 451 or unitary substrate comprising the touchpad surface panel and both palm rest panels (e.g., as described above with respect to FIG. 3B) may be RF-transparent. Thus, the area where a portion of the touchpad surface panel 451 or unitary substrate comprising the touchpad surface panel and both palm rest panels (e.g., as described above with respect to FIG. 3B) extends beyond the support bracket 455 and the touchpad PCBA 453 toward the front edge of the base chassis upper portion 440 may form one or more RF transparent zones 464.

At block 714, an RF antenna may be mechanically coupled or otherwise affixed to the upper portion of the base chassis such that a portion of the RF antenna is disposed directly beneath the RF-transparent zone in an embodiment. For example, in an embodiment described with respect to FIG. 4H, an RF antenna 463 in an embodiment may be mounted at least partially within or beneath this RF transparent zone 464. As also described in an embodiment with respect to FIG. 4I, the RF antenna 463 may be mounted beneath the support bracket 455 and extending at least partially beyond the support bracket 455 toward the front edge of the base chassis upper portion 440. For example, a portion of the RF antenna 463 may be situated beneath the RF-transparent zone (e.g., 464).

Many information handling systems employ a plurality of RF antennas for communication in more than one communication standard or frequency range (e.g., WWAN, WLAN, Bluetooth®, NFC). Placement of these antennas (e.g., including 463) without interference is a challenge. Thus, there is a need to distribute antennas (e.g., including 463) around the edges of the base chassis (e.g., 440) where possible. In conventional systems, RF antennas cannot be placed directly under the haptic touchpad assembly situated nearest the front edge of the base chassis (e.g., directly beneath the leading edge of 451) because some conventional touchpad material, such as metal, or the PCBA, mechanical switches or supporting structure may inhibit transmission of RF waves. Because the top surface 451 of the touchpad and palm rest assembly in embodiments of the present disclosure employ a polycarbonate impregnated composite substrate of woven glass fiber that is RF-transparent, antennas (e.g., 463) may now be placed on the front edge of the base chassis 440, located nearest the user, at one or more radiofrequency window locations (e.g., 464). This may result in additional locations for disposing multiple antennas for distribution of antennas within the chassis, or the ability to add an additional antenna not previously enclosed within the base chassis in conventional systems.

A keyboard may be mounted within the keyboard opening of the upper portion of the base chassis and operably coupled to the PCBA in an embodiment at block 716. For example, in an embodiment described with respect to FIG. 4J, a keyboard 411 in an embodiment may be inserted within the keyboard opening 441 of the base chassis upper portion 440 and operably coupled to the touchpad printed circuit board assembly (PCBA) of the haptic touchpad assembly (e.g., as described above with respect to FIG. 2). The three-panel or unitary substrate haptic touchpad and palm rest assembly or the window mounted haptic touchpad for the information handling system base chassis in some example embodiments may provide an aesthetically pleasing and durable upper surface that is seamless or near seamless across the base chassis. The three panels or unitary substrate may be comprised of the same polycarbonate impregnated composite substrate of woven glass fiber that provides a glass-like texture and may increase the surface area and "clickable" area of the touchpad in comparison to the dive-board design of conventional base chasses. Because a polycarbonate impregnated composite substrate of woven glass fiber has greater durability than traditional glass panels, the edges of the touchpad surface panel 451 and neighboring palm rests 402 and 403 or a single substrate comprising all three of these structures (e.g., as described at 305 with respect to FIG. 3B) may extend to the outer borders of the base chassis upper portion 440 without encountering the durability concerns encountered when using a glass panel. Further, the left and right palm rest surface panels 402 and 403 in an embodiment may be fixed to the base chassis upper portion 440 in the three-panel design (e.g., as described above with respect to FIG. 3A) so as to conceal the top-mounted side screws used to fix the touchpad surface panel 451 to the base chassis upper portion 440.

At block 718, the upper portion of the base chassis may be operatively coupled or otherwise affixed to the bottom portion of the base chassis in an embodiment to enclose the RF antenna between the RF-transparent window portion of the bottom portion of the base chassis and the RF transparent zone created between the touchpad top cover and the upper portion of the base chassis in an embodiment at block 716. This may occur after communicative coupling of the touchpad and its PCBA to other components such as processors, memory, bus systems, and power of the information handling system in the lower portion of the base chassis. For example, in an embodiment described with respect to FIG. 4J, the base chassis may include a lower portion or housing that may be joined to the base chassis upper portion 440 to enclose the components of the information handling system. In another example embodiment described with respect to FIG. 4H, the RF antenna 463 in an embodiment may be mounted at least partially within or beneath this RF transparent zone 464, and may be enclosed within an RF-transparent base chassis lower portion 465 (e.g., comprising an RF-transparent plastic). In such a way, the haptic touchpad and palm rest base chassis assembly employing a polycarbonate impregnated composite substrate of woven glass fiber may provide sufficient stiffness to support a haptics-driven touchpad assembly, a lower risk of chipping and cracking than glass, a glass-like finish that is aesthetically pleasing, and a light-transmissivity to illuminate the touchpad surface without a need for a separate lightguide layer.

The blocks of the flow diagram of FIGS. 6 and 7 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A touchpad and palm rest base chassis assembly for an information handling system comprising:
    an upper portion of a base chassis for enclosing at least a portion of the information handling system including a keyboard opening and a keyboard, and a plurality of palm rest support surface panels on a plurality of palm rest support sections;
    a composite substrate of woven glass fiber impregnated with polycarbonate material forming a touchpad surface, through which a user's touch may be sensed by an array of capacitive sensors situated beneath a portion of the composite substrate;
    a touchpad printed circuit board assembly (PCBA) operatively connected the composite substrate and the array of capacitive sensors between a touchpad support bracket and the touchpad surface, where the touchpad support bracket is operatively coupled on each side to the plurality of palm rest support sections;
    a light emitting diode (LED) disposed within an etched trough in the underside of the composite substrate of the touchpad surface and operatively connected to the touchpad PCBA, where the etched trough is formed to guide light emitted from the LED into the composite substrate of the touchpad surface, where the composite substrate is light transmissive to negate need of a separate light guide layer for the touchpad PCBA;
    an icon etching within an inked surface applied to a portion of the composite substrate of the touchpad surface situated above a haptic actuator assembly coupled below the touchpad PCBA and the composite substrate and in the touchpad support bracket, where the icon etching is illuminated by the LED; and
    the touchpad and palm rest base chassis assembly mechanically affixed to the upper portion of the base chassis.

2. The touchpad and palm rest assembly of claim 1 further comprising:
    the haptic actuator assembly is a piezo assembly for haptic user feedback disposed beneath the touchpad PCBA and operably coupled to the touchpad PCBA; and
    the haptic user feedback transmissible through the composite substrate.

3. The touchpad and palm rest assembly of claim 1, where the etched trough in the underside of the composite substrate of the touchpad surface is machined.

4. The touchpad and palm rest assembly of claim 1, wherein the etched trough in the underside of the composite substrate of the touchpad surface is formed through acid etching.

5. The touchpad and palm rest assembly of claim 1 further comprising:
    an antenna operably coupled to a network interface device of the information handling system disposed at least partially beneath a front portion of the composite substrate of the touchpad surface, where the composite substrate is radiofrequency (RF) transparent.

6. The touchpad and palm rest assembly of claim 1 further comprising:
at least one of the array of capacitive sensors disposed beneath the composite substrate to sense icon contact between a user and a portion of the composite substrate with the icon etching.

7. The touchpad and palm rest assembly of claim 1 further comprising:
the composite substrate comprising a unitary surface forming the touchpad surface and extending to form palm rest surfaces situated to either side of the touchpad surface.

8. The touchpad and palm rest assembly of claim 1 further comprising:
the composite substrate comprising the touchpad surface as part of a three panel touchpad and palm rest base chassis assembly including adjacent left and right palm rest surface panels situated to either side of the touchpad surface.

9. A method of manufacturing a single-panel touchpad and palm rest base chassis assembly for an information handling system comprising:
forming a touchpad surface, a right palm rest surface, and a left palm rest surface, using a unitary composite substrate of woven glass fiber impregnated with polycarbonate material through which a user's touch may be sensed by an array of capacitive sensors situated beneath a portion of the unitary composite substrate that serves as the touchpad surface, where the right palm rest surface and the left palm rest surface extend over and are supported by a right palm rest support section and a left palm rest support section of a base chassis;
a touchpad printed circuit board assembly (PCBA) operatively connected to the portion of the unitary composite substrate that is the touchpad surface between a touchpad support bracket and the touchpad surface, where the touchpad support bracket is operatively coupled on each side to the right palm rest support section and the left palm rest support section of the base chassis;
disposing a light emitting diode (LED) operatively connected to the touchpad PCBA within an etched trough of the unitary composite substrate at the touchpad surface, where the etched trough is formed to guide light emitted from the LED into the unitary composite substrate that is light transmissive to illuminate an icon etching within an inked surface applied to the portion of the unitary composite substrate serving as the touchpad surface, such that the icon is illuminated in the touchpad surface but not the right palm rest surface and the left palm rest surface of the unitary composite substrate;
affixing the unitary composite substrate to a plurality of palm rest support surfaces of an upper portion of a base chassis for enclosing at least a portion of the information handling system such that the unitary composite substrate defines a seamless surface to side boundaries of the base chassis upper portion from a front edge boundary of the base chassis upper portion to a rear edge that is a boundary for a keyboard opening; and
installing a keyboard in the keyboard opening to enclose a remaining portion of the information handling system.

10. The method of claim 9 further comprising:
disposing a piezo assembly for haptic user feedback beneath the touchpad PCBA; and
operably connecting the piezo assembly to the touchpad PCBA and portion of the unitary composite substrate that is the touchpad surface, where the haptic user feedback is transmitted through the touchpad surface of the unitary composite substrate at the icon illuminated portion.

11. The method of claim 9 further comprising:
machining the etched trough in the unitary composite substrate of woven glass fiber impregnated with polycarbonate material for insertion of the LED within the unitary composite substrate.

12. The method of claim 9 further comprising:
acid etching the etched opening in the unitary composite substrate of woven glass fiber impregnated with polycarbonate material for insertion of the LED within the unitary composite substrate.

13. The method of claim 9 further comprising:
disposing a radiofrequency (RF) antenna at least partially beneath a front portion of the unitary composite substrate; and
operably connecting the RF antenna to a network interface device of the information handling system.

14. The method of claim 9 further comprising:
disposing at least one of the array of capacitive sensors beneath the unitary composite substrate to sense icon contact between a user and the icon etching on the unitary composite substrate.

15. The method of claim 10 further comprising:
disposing at least one piezo assembly beneath the unitary composite substrate to sense force applied to the icon etching on the unitary composite substrate.

16. A three-panel touchpad and palm rest base chassis assembly for an information handling system comprising:
an upper portion of a base chassis for enclosing at least a portion of the information handling system including a keyboard opening with a keyboard, a touchpad opening for insertion of a touchpad having a touchpad surface panel, and a plurality of palm rest support surfaces adjacent to either side of the touchpad surface panel;
a first palm rest surface panel disposed on top of a first palm rest support section of a base chassis and including a first side edge at a first side boundary of the base chassis upper portion, and a second side edge disposed adjacent to the touchpad surface panel;
a second palm rest surface panel disposed on top of a second palm rest support section of the base chassis and including a third side edge at a second side boundary of the base chassis upper portion, and a fourth side edge disposed adjacent to the touchpad surface panel;
the touchpad surface panel and each of the first and second palm rest surface panels having a front edge defining a portion of a user-facing boundary of the base chassis upper portion and a rear edge forming a portion of the keyboard opening for the keyboard;
a touchpad printed circuit board assembly (PCBA) operatively coupled between a touchpad support bracket and the touchpad surface panel, where the touchpad support bracket is operatively coupled on each side to the first palm rest support section and the second palm rest support section;
the touchpad surface panel comprising a composite substrate of woven glass fiber impregnated with polycarbonate material that is light transmissive and stiff such that haptic feedback may be provided via a haptic actuator operatively coupled beneath the touchpad surface panel and the touchpad PCBA within the touchpad support bracket; and a light emitting diode (LED) disposed within an etched opening on the underside of the touchpad surface panel and operatively connected to the touchpad PCBA, where the etched opening is formed to guide light emitted from the LED into the light transmissive composite substrate of the touchpad surface panel to illuminate an icon etching of the icon within an inked surface applied to the composite substrate of the touchpad surface panel.

17. The three-panel touchpad and palm rest assembly of claim 16 further comprising:

the haptic actuator includes a piezo assembly for haptic user feedback disposed between the touchpad PCBA and the support bracket and operably coupled to the touchpad PCBA; and the haptic user feedback from the piezo assembly transmissible through the touchpad surface panel.

18. The three-panel touchpad and palm rest assembly of claim 17 further comprising:

the piezo assembly detects a force applied by a user at the icon etching and provides haptic user feedback to the icon on the composite substrate of the touchpad surface panel.

19. The three-panel touchpad and palm rest assembly of claim 16 further comprising:

at least one of the array of capacitive sensors disposed beneath the touchpad surface panel to sense icon contact between a user and the icon etching on the composite substrate of the touchpad surface panel.

20. The three-panel touchpad and palm rest assembly of claim 16 further comprising:

the first palm rest surface panel and the second palm rest surface panel both comprising a composite substrate of woven glass fiber impregnated with polycarbonate material to provide a near seamless three-panel touchpad and palm rest assembly on the upper portion of a base chassis.

* * * * *